(12) United States Patent  
Teh

(10) Patent No.: US 9,973,080 B2  
(45) Date of Patent: May 15, 2018

(54) SWITCHED CAPACITOR POWER SUPPLY CIRCUIT

(71) Applicant: Kabushiki Kaisha Toshiba, Minato-Ku, Tokyo (JP)

(72) Inventor: Chen Kong Teh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 15/060,749

(22) Filed: Mar. 4, 2016

(65) Prior Publication Data

US 2017/0063222 A1    Mar. 2, 2017

(30) Foreign Application Priority Data

Sep. 2, 2015    (JP) ................................. 2015-172909

(51) Int. Cl.
     *G05F 3/02*      (2006.01)
     *G05F 1/10*      (2006.01)
     *H02M 3/07*      (2006.01)

(52) U.S. Cl.
     CPC ..................... *H02M 3/07* (2013.01)

(58) Field of Classification Search
     CPC .. H02M 3/073; H02M 3/07; H02M 2003/077; G11C 5/145; G05F 3/205
     USPC ....................... 327/536; 363/59–60
     See application file for complete search history.

(56) References Cited

U.S. PATENT DOCUMENTS

| | | | | |
|---|---|---|---|---|
| 5,943,271 A | * | 8/1999 | Fujita | G11C 5/146 327/534 |
| 6,055,168 A | * | 4/2000 | Kotowski | H02M 3/07 307/110 |
| 6,169,673 B1 | * | 1/2001 | McIntyre | H02M 3/07 363/59 |
| 6,198,645 B1 | * | 3/2001 | Kotowski | H02M 3/07 307/110 |
| 6,215,288 B1 | | 4/2001 | Ramsey et al. | |
| 6,563,235 B1 | * | 5/2003 | McIntyre | H02M 3/07 307/109 |
| 6,753,623 B2 | * | 6/2004 | McIntyre | H02M 3/07 307/109 |
| 6,937,517 B2 | * | 8/2005 | Pekny | H02M 3/07 365/185.18 |
| 7,999,601 B2 | * | 8/2011 | Schlueter | H03K 17/063 327/383 |
| 8,797,770 B2 | * | 8/2014 | Conta | H02M 3/07 307/110 |

(Continued)

FOREIGN PATENT DOCUMENTS

| | | |
|---|---|---|
| JP | 2009-148150 A | 7/2009 |
| JP | 2011-217561 A | 10/2011 |
| WO | 01-63723 A2 | 8/2001 |

*Primary Examiner* — Quan Tra
(74) *Attorney, Agent, or Firm* — White & Case LLP

(57) ABSTRACT

According to one embodiment, a switched capacitor power supply circuit includes a switched capacitor power supply circuit unit that supplies a voltage obtained by converting an input voltage with a predetermined conversion ratio as an output voltage by switching a connection configuration between a plurality of capacitors that perform charge and discharge, and a control circuit that switches the connection configuration between the plurality of capacitors according to the output voltage to change the conversion ratio.

15 Claims, 17 Drawing Sheets

(56) References Cited

U.S. PATENT DOCUMENTS

2008/0100233 A1* 5/2008 Negoi .................... H02M 3/07
                                                    315/299
2009/0128212 A1   5/2009 Liu et al.
2013/0077411 A1*  3/2013 Nguyen ................ G11C 16/06
                                                    365/185.23

* cited by examiner

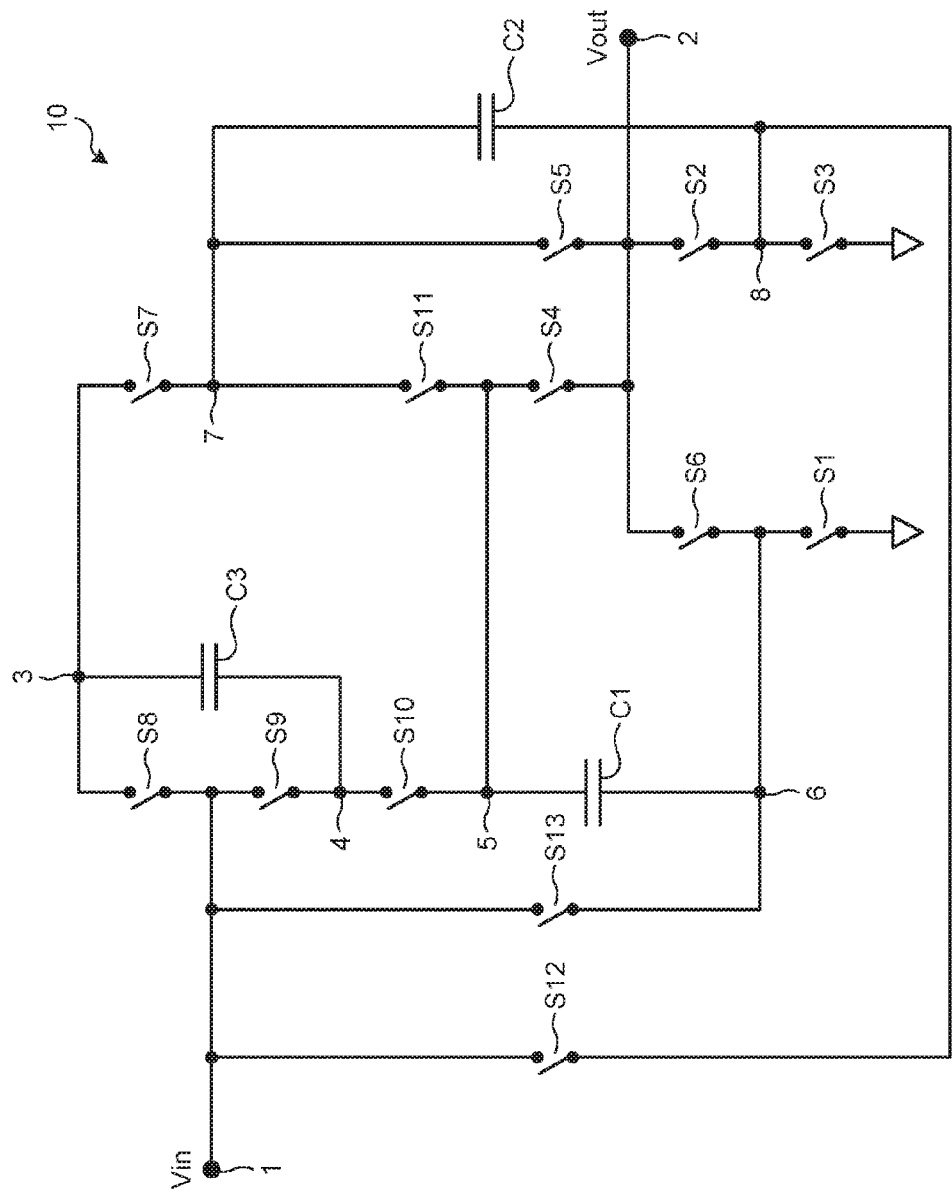

| | S1 | S2 | S3 | S4 | S5 | S6 | S7 | S8 | S9 | S10 | S11 | S12 | S13 |
|---|---|---|---|---|---|---|---|---|---|---|---|---|---|
| 1/3 | φ2 | φ2 | φ1 | φ2 | off | φ1 | φ2 | φ1 | on | off | φ1 | off | off |
| 2/5 | φ2 | φ2 | φ1 | φ2 | off | φ1 | φ2 | φ1 | φ2 | φ1 | φ1 | off | off |
| 1/2 | φ2 | φ2 | φ1 | φ2 | φ1 | φ1 | φ2 | φ1 | φ2 | φ1 | off | off | off |
| 2/3 | on | φ2 | φ1 | φ2 | φ1 | off | φ2 | φ1 | φ2 | φ1 | off | off | off |
| 3/4 | off | φ2 | φ1 | φ2 | φ1 | φ1 | φ2 | φ1 | φ2 | φ1 | off | off | φ2 |
| 1/1 | on | off | on | φ2 | φ1 | off | φ2 | φ1 | φ2 | φ1 | off | φ1 | off |
| 4/3 | off | off | φ2 | φ2 | φ1 | φ1 | φ2 | φ1 | φ2 | φ1 | off | off | φ2 |
| 3/2 | φ1 | off | on | φ2 | φ1 | off | φ2 | φ1 | φ2 | φ1 | off | φ1 | φ2 |
| 2/1 | φ1 | off | φ2 | φ2 | φ1 | off | φ2 | φ1 | φ2 | φ1 | off | φ1 | φ2 |

φ1

φ2

SWITCHED CAPACITOR POWER SUPPLY CIRCUIT

CROSS-REFERENCE TO RELATED APPLICATIONS

This application is based upon and claims the benefit of priority from Japanese Patent Application No. 2015-172909, filed on Sep. 2, 2015; the entire contents of which are incorporated herein by reference.

FIELD

Embodiments described herein relate generally to a switched capacitor power supply circuit.

BACKGROUND

Conventionally, a switched capacitor power supply circuit has been disclosed which includes switching elements and capacitors, and controls the switching elements and switches a connection configuration of the capacitors to gain a desired output voltage. In order to convert input voltage into the desired output voltage, the switched capacitor power supply circuit is desirably configured to gain the desired output voltage efficiently corresponding to a wide range of levels of the input voltage. Also, it is desirable that the switched capacitor power supply circuit is capable of making up for its shortcoming that the output current is small.

BRIEF DESCRIPTION OF THE DRAWINGS

FIG. 1 is a schematic diagram illustrating a configuration of a switched capacitor power supply circuit unit according to a first embodiment;

DETAILED DESCRIPTION

Figures 2A, 2B:
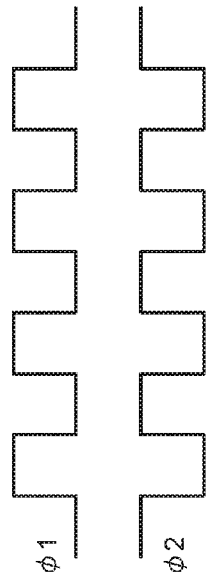
FIGS. 2A and 2B are diagrams illustrating a relation of the conversion ratio with a gate signal to be supplied.

In general, according to one embodiment, a switched capacitor power supply circuit includes a switched capacitor power supply circuit unit that includes a plurality of capacitors and supplies to an output terminal a voltage obtained by converting an input voltage with a predetermined conversion ratio as an output voltage by switching a connection configuration between the plurality of capacitors and charging/discharging the plurality of capacitors. It also includes a control circuit that supplies to the switched capacitor power supply circuit unit a control signal for changing the conversion ratio by switching the connection configuration between the plurality of capacitors according to the output voltage.

Exemplary embodiments of a switched capacitor power supply circuit will be explained below in detail with reference to the accompanying drawings. The present invention is not limited to the following embodiments.

First Embodiment

FIG. 1 is a diagram illustrating a configuration of a switched capacitor power supply circuit unit according to a first embodiment, which is a diagram depicting a structure of one embodiment of a core unit (referred to as 'switched capacitor power supply circuit unit' hereinafter) composed of capacitors and switching elements. A switched capacitor power supply circuit unit 10 of the embodiment includes an input terminal 1. A DC input voltage Vin is applied to the input terminal 1. A capacitor C3 is connected between a first connection node 3 and a second connection node 4. A switching element S8 is connected between the first connection node 3 and the input terminal 1. A switching element S9 is connected between the input terminal 1 and the second connection node 4.

A switching element S10 is connected between the second connection node 4 and a third connection node 5. A capacitor C1 is connected between the third connection node 5 and a fourth connection node 6. A switching element S13 is connected between the input terminal 1 and the fourth connection node 6.

A switching element S7 is connected between the first connection node 3 and a fifth connection node 7. A switching element S11 is connected between the third connection node 5 and the fifth connection node 7. A switching element S4 is connected between the third connection node 5 and an output terminal 2. A switching element S5 is connected between the fifth connection node 7 and the output terminal 2.

A switching element S6 is connected between the fourth connection node 6 and the output terminal 2. A switching element S1 is connected between the fourth connection node 6 and the ground.

A switching element S2 is connected between a sixth connection node 8 and the output terminal 2. A switching element S3 is connected between the sixth connection node 8 and the ground. A capacitor C2 is connected between the sixth connection node 8 and the fifth connection node 7. A switching element S12 is connected between the input terminal 1 and the sixth connection node 8.

The switched capacitor power supply circuit unit 10 according to this embodiment converts the DC input voltage Vin supplied to the input terminal 1 with a predetermined conversion ratio and then outputs a DC output voltage Vout from the output terminal 2. According to this embodiment, ON/OFF control of the switching elements (S1 to S13) enables a connection configuration between three capacitors C1 to C3 to switch and enables the capacitors (C1 to C3) to charge/discharge, resulting in nine variations of the conversion ratio.

FIG. 2A is a table illustrating a relation between the conversion ratio of the input voltage Vin to the output voltage Vout (Vin/Vout) and a gate signal applied to each of the switching elements (S1 to S13). In FIG. 2A, mathematical figures in the leftmost column represent the conversion ratio. They suggest that nine variations of the conversion ratio may be obtained. In FIG. 2A, 'off' denotes the switching elements to which a gate control signal "off" enabling them to turn off is applied. For example, when the conversion ratio is set to 1/3, the switching element S10 is supplied with the gate control signal "off" enabling the switching element S10 to turn off and stay while the conversion ratio for the switched capacitor power supply circuit unit 10 keeps unchanged from 1/3. Similarly, 'on' denotes the switching elements to which a gate control signal "on" enabling them to turn on is supplied. For example, when the conversion ratio is set to 1/3, the switching element S9 is supplied with the gate control signal "on" enabling the switching element S9 to turn on and stay while the conversion ratio for the switched capacitor power supply circuit unit 10 keeps unchanged from 1/3. As mentioned above, the gate signal supplied to the switched capacitor power supply circuit unit 10 includes the gate control signals ("on" and "off") that are supplied to the selected one or more of the switching elements to set the conversion ratio and gate drive signals ("φ1" and "φ2") that enable the remaining switching elements to turn on/off in a predetermined cycle.

In FIG. 2A, 'φ1' and 'φ2' respectively denote correspondence relations to the switching elements to which the complementary High- and Low-level gate drive signals ("φ1" and "φ2") are supplied. For example, when the conversion ratio is set to 1/3, the gate drive signal "φ1" is supplied to the switching element S8, and the gate drive signal "φ2" is supplied to the switching element S7. The gate drive signals ("φ1" and "φ2") have their levels switched between the High and Low at a predetermined timing and are supplied to the corresponding switching elements, so as to enable the capacitors (C1 to C3) to charge/discharge.

FIG. 2B illustrates the gate drive signals ("φ1" and "φ2"). They are complementary signals and supplied to the corresponding switching elements. The switching elements (S1 to S13) may be each composed of an NMOS transistor or a PMOS transistor. The switching elements may be configured so that any of them in FIG. 2A to which the gate drive signal "φ1" is applied turns on when the gate drive signal "φ1" is of High-level, for example.

Second Embodiment

Figure 3:
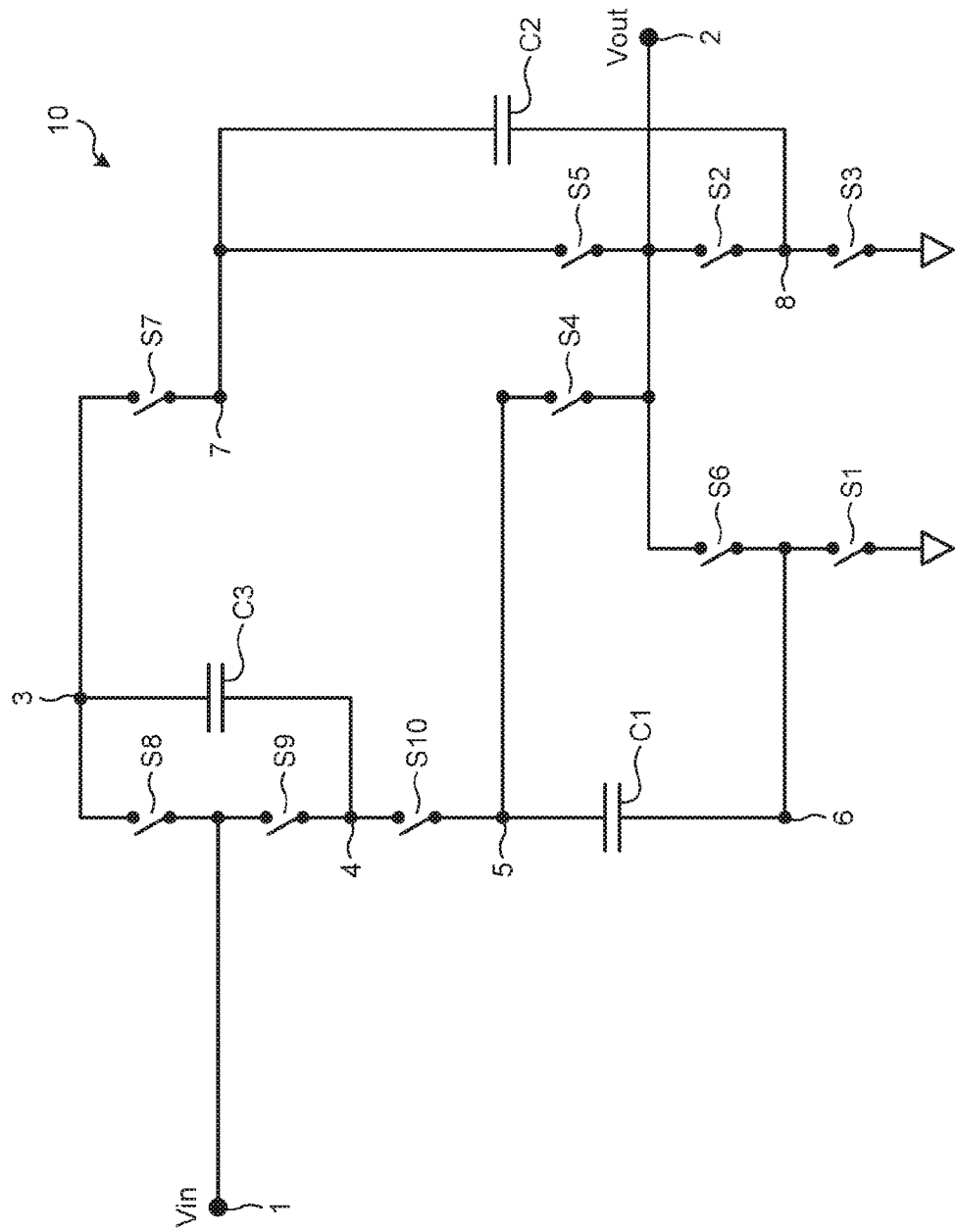
FIG. 3 is a schematic diagram illustrating a configuration of a switched capacitor power supply circuit unit according to a second embodiment.

FIG. 3 is a diagram illustrating a configuration of a switched capacitor power supply circuit unit 10 according to a second embodiment. Elements corresponding to those of the aforementioned embodiment are denoted by the same reference symbols. This embodiment is provided as an embodiment where the conversion ratio (Vout/Vin) is 1/2.

As described with reference to FIG. 2A, when the conversion ratio is set to 1/2, the gate control signal "off" is applied to the switching elements (S13, S12, and S11) selected in the embodiment illustrated in FIG. 1, so as to turn the switching elements (S13, S12, and S11) off. FIG. 3 illustrates the equivalent to a structure revised from the embodiment in FIG. 1 where such switching elements are turned off, or namely, turned into open state.

Figure 4A:
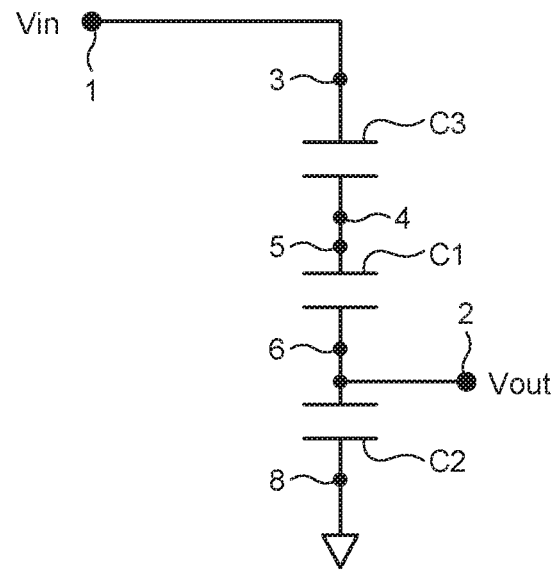
FIGS. 4A and 4B are diagrams illustrating a circuit operation of the embodiment in FIG. 3.
Figure 4B:
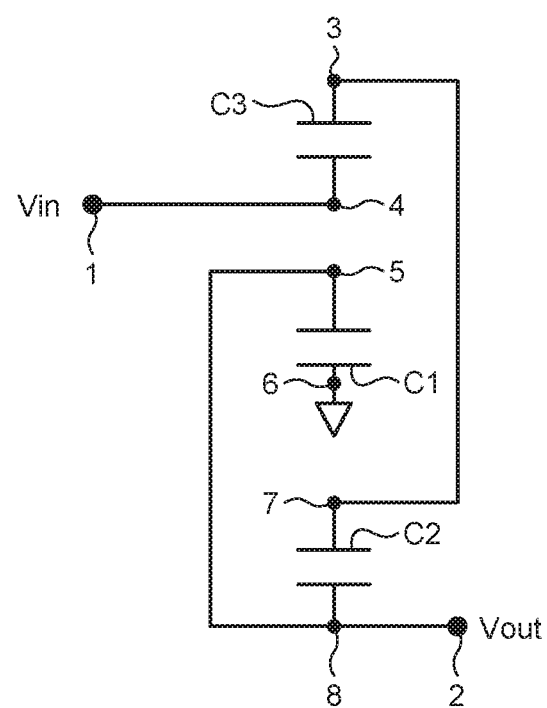

FIGS. 4A and 4B are diagrams illustrating a circuit operation of the embodiment in FIG. 3. FIG. 4A illustrates a state when the gate drive signal "φ1" is of High-level. Specifically, it illustrates a connection configuration between the capacitors (C1 to C3) when the switching elements (S10, S8, S6, S5, and S3) to which the gate drive signal "φ1" is applied are turned on. FIG. 4B illustrates a state when the gate drive signal "φ2" is of High-level. Similarly, it illustrates a connection configuration between the capacitors (C1 to C3) when the switching elements (S9, S7, S4, S2, and S1) to which the gate drive signal "φ2" is applied are turned on.

The voltage applied to the capacitors (C1 to C3) are as expressed in the following equations (1) to (3). In each of these equations, the left side expresses the voltage when the gate drive signal "φ1" is of High-level while the right side expresses the same when the gate drive signal "φ2" is of High-level.

The voltage applied to the opposite terminals of the capacitor C3 is expressed in the equation (1):

$$Vin-V4=V7-Vin \qquad (1)$$

where V4 is a voltage at the second connection node 4, V7 is a voltage at the fifth connection node 7.

Similarly, the voltage applied to the opposite terminals of the capacitor C1 is expressed in the equation (2):

$$V4-Vout=Vout-0 \qquad (2)$$

The voltage applied to the opposite terminals of the capacitor C2 is expressed in the equation (3):

$$Vout-0=V7-Vout \qquad (3)$$

From the above equations (1) to (3), Vout=0.5×Vin is obtained. Specifically, the gate drive signals ("φ1" and "φ2") enable the switching elements illustrated in FIG. 3 to turn on or off and enable the first to third capacitors (C1 to C3) to charge/discharge, and thereby, the switched capacitor power supply circuit unit 10 with the conversion ratio of 1/2 is configured. Similarly, the gate signal is applied in the correspondence relation illustrated in FIG. 2A to each of the switching elements (S1 to S13) of the first embodiment illustrated in FIG. 1, and thereby, the conversion ratio as illustrated in the leftmost column of the table can be obtained.

The embodiment in FIG. 3 is, as mentioned above, equivalent to the embodiment revised from the embodiment in FIG. 1 where the switching elements (S11 to S13) are turned into open state, that is, the switching elements (S11 to S13) are eliminated. For example, as illustrated in the table of FIG. 2A, when the embodiment is that which is revised from the embodiment in FIG. 3 where the switching element S11 is further connected between the third connection node 5 and the fifth connection node 7, that is to say, the switching elements (S12 and S13) are eliminated from the structure of the embodiment in FIG. 1, supplying the gate drive signals ("φ1" and "φ2") and the gate control signals ("on" and "off") in the correspondence relation illustrated in FIG. 2A to the switching elements (S1 to S11) can result in five variations of the conversion ratio (1/3, 2/5, 1/2, 2/3, and 1/1). According to the desired conversion ratio, the structure of the embodiments can be appropriately modified by using the table in FIG. 2A.

Figure 5:
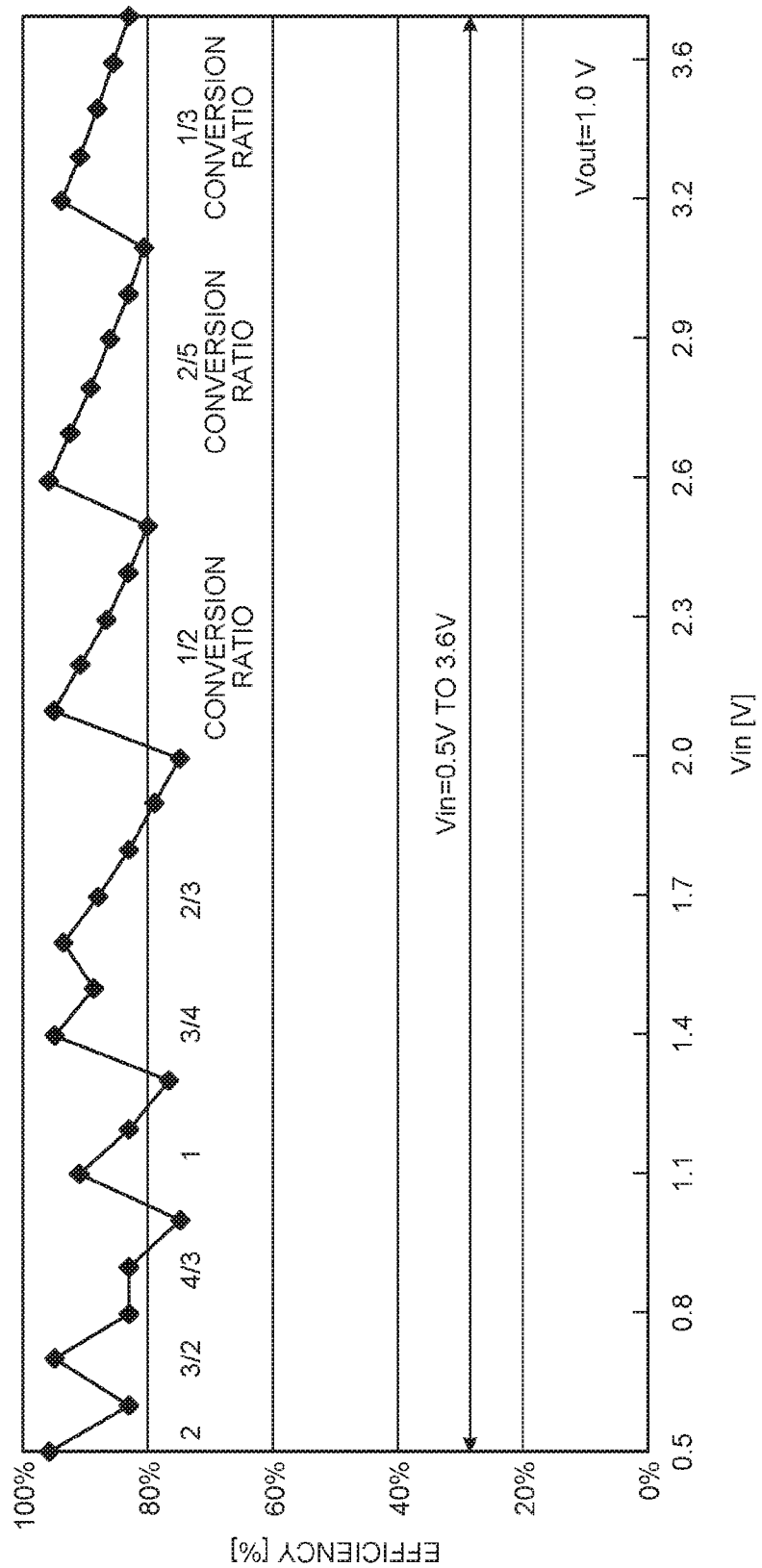
FIG. 5 is a diagram illustrating a relation of the input voltage and settings of the conversion ratio.

FIG. 5 is a diagram illustrating a relation between the input voltage Vin and settings of the conversion ratio. The horizontal axis represents the DC input voltage Vin while the vertical axis represents the conversion efficiency from the input voltage Vin to the output voltage Vout. In the first embodiment of the switched capacitor power supply circuit unit 10 illustrated in FIG. 1, as mentioned above, turning the switching elements (S1 to S13) on or off and then switching connections among the first to third capacitors (C1 to C3), and further, applying the gate drive signals ("φ1" and "φ2") and enabling the capacitors (C1 to C3) to charge/discharge can result in nine variations of the conversion ratio (1/3, 2/5, 1/2, 2/3, 3/4, 1/1, 4/3, 3/2, and 2/1).

FIG. 5 illustrates a method of setting the conversion ratio when the conversion results in 1.0 V (volt) of the output voltage Vout. As to conversion efficiency, it becomes greater when the voltage resulting from the conversion of the input voltage Vin with the predetermined conversion ratio and being left intact is output as the output voltage Vout. In other words, such a configuration as to convert the input voltage Vin with the predetermined conversion ratio and permit the resultant voltage converted with such a rate to be output as the output voltage Vout can retain the converting efficiency at high level. Thus, the configuration where the conversion ratio is switched according to the input voltage Vin to obtain a desired level of the output voltage Vout can result in the desired output voltage Vout with high conversion efficiency.

For example, when the input voltage Vin is 2.0 V, adjusting the conversion ratio to 1/2 can result in 1.0 V of the output voltage Vout. Similarly, when the input voltage Vin becomes 3 V or higher, adjusting the conversion ratio to 1/3 can result in the target value 1.0 V of the output voltage Vout with high conversion efficiency. Similarly, when the input voltage Vin becomes lower than 1.0 V, such a configuration as to switch the conversion ratio according to the input voltage Vin to a rate greater than 1 like 3/2 or 2/1 and step up the input voltage Vin to obtain the output voltage Vout can result in the desired output voltage Vout with high conversion efficiency. In accordance with the embodiment illustrated in FIG. 1, nine variations of the conversion ratio providing for voltage step-up to voltage step-down can be obtained, and thereby, the switched capacitor voltage power supply circuit unit 10 with high conversion efficiency relative to a wide range of levels of the input voltage Vin can be provided.

Third Embodiment

Figure 6A:
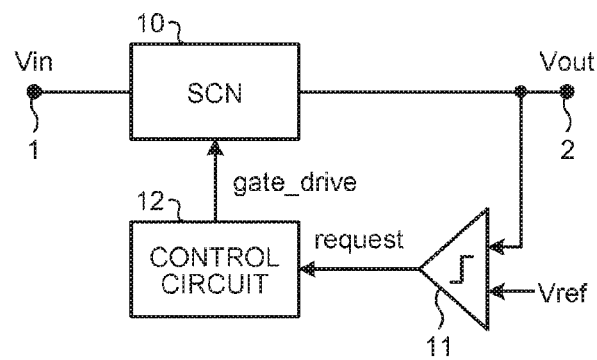
FIGS. 6A and 6B are diagrams respectively illustrating a configuration and its control timing of a switched capacitor power supply circuit according to a third embodiment.

FIG. 6A is a diagram illustrating a configuration a switched capacitor power supply circuit according to a third embodiment. Elements corresponding to those of the aforementioned embodiments are denoted by the same reference symbols. This embodiment includes a switched capacitor power supply circuit unit 10 that is supplied with a DC input voltage Vin applied to an input terminal 1. The switched capacitor power supply circuit unit 10 has a configuration like the aforementioned one of the first embodiment illustrated in FIG. 1, for example.

This embodiment includes a comparator circuit 11 to which an output voltage Vout and a reference voltage Vref are applied. The comparator circuit 11 produces an output signal "request" of High-level, for example, when the output voltage Vout becomes lower than the reference voltage Vref.

This embodiment includes a control circuit 12 that responds to the output signal "request" from the comparator circuit 11. For example, in response to the output signal "request" of High-level from the comparator circuit 11, the control circuit 12 supplies a gate signal "gate_drive" to the switched capacitor power supply circuit unit 10. The gate signal "gate_drive" includes, for example, the aforementioned gate drive signals ("φ1" and "φ2") illustrated in FIG. 2 and the gate control signals ("on" and "off") supplied to selected one or more of switching elements to set the conversion ratio. The switched capacitor power supply circuit unit 10 enables capacitors (not illustrated) to charge/discharge in response to the gate signal "gate_drive" and outputs the output voltage Vout according to the conversion ratio.

Figure 6B:
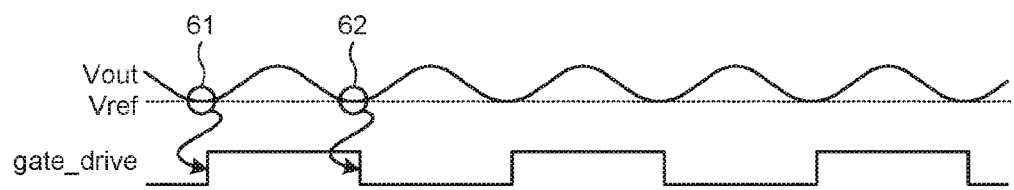

With reference to FIG. 6B, the control timing of this embodiment will be discussed. The comparator circuit 11 compares the output voltage Vout with the reference voltage Vref and then, for example, outputs the output signal ("request", not illustrated) of High-level at a timing 61 of having the output voltage Vout lower than the reference voltage Vref.

The control circuit 12 turns the gate signal "gate_drive" supplied to the switched capacitor power supply circuit unit 10 to High-level in response to the output signal "request" of High-level from the comparator circuit 11. The gate signal "gate_drive", which, as mentioned above, includes the gate drive signals ("φ1" and "φ2") illustrated in FIG. 2B and the gate control signals ("on" and "off") that turn the switching elements on or off to set the conversion ratio, refers to a signal equivalent to the gate drive signal "φ1" for the sake of convenience. Thus, when the gate signal "gate_drive" is of High-level, the gate drive signal "φ1" is turned to High-level while the gate drive signal "φ2" is turned to Low-level. Supplied with the gate signal "gate_drive", the switched capacitor power supply circuit unit 10 operates to charge/discharge, which results in the output voltage Vout being stepped up according to the conversion ratio.

At a timing 62 when the output voltage Vout becomes lower than the reference voltage Vref, the comparator circuit 11 again outputs the output signal "request" of High-level. The control circuit 12 turns the gate signal "gate_drive" supplied to the switched capacitor power supply circuit unit 10 to Low-level in response to the output signal "request" of High-level from the comparator circuit 11. This enables the gate drive signal "φ2" to turn to High-level and the gate drive signal "φ1" to turn to Low-level and then causes the switched capacitor power supply circuit unit 10 to operate to charge/discharge operation, which results in the output voltage Vout being stepped up according to the conversion ratio.

In accordance with this embodiment, when the output voltage Vout becomes lower than the predetermined reference voltage Vref, the control circuit 12 supplies the switched capacitor power supply circuit unit 10 with the gate signal "gate_drive" that causes it to charge/discharge. Under such control, the output voltage Vout can be retained at the level of the reference voltage Vref.

Fourth Embodiment

Figure 7:
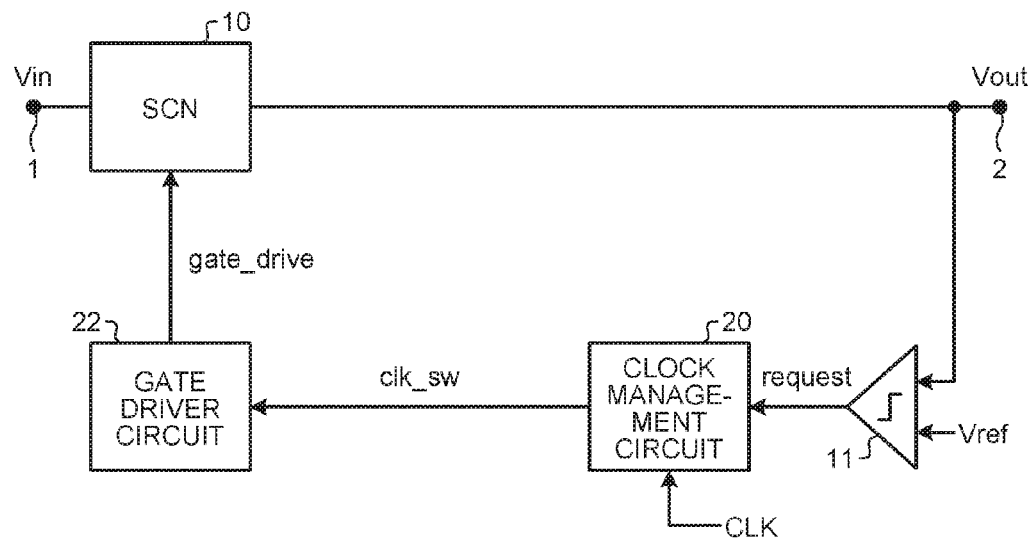
FIG. 7 is a diagram illustrating a configuration of a switched capacitor power supply circuit according to a fourth embodiment.

FIG. 7 is a diagram illustrating a configuration of a switched capacitor power supply circuit according to a fourth embodiment. Elements corresponding to those of the aforementioned embodiments are denoted by the same reference symbols. This embodiment includes a clock management circuit 20 supplied with an output signal "request" from a comparator circuit 11. The clock management circuit 20 is supplied with a clock signal "CLK". The clock management circuit 20 outputs a clock output signal "clk_sw" in response to the output signal "request" from the comparator circuit 11 only when it is supplied with the clock signal "CLK". The clock management circuit 20 includes, for example, an AND circuit (not illustrated) supplied with the clock signal "CLK" and the output signal "request" from the comparator circuit 11.

The clock output signal "clk_sw" from the clock management circuit 20 includes signals equivalent to complementary gate drive signals ("φ1" and "φ2").

A gate driver circuit 22 amplifies the clock output signal "clk_sw" from the clock management circuit 20 and outputs a gate signal "gate_drive". The gate signal "gate_drive" is supplied to a switched capacitor power supply circuit unit 10. The gate signal "gate_drive" includes the complementary gate drive signals ("φ1" and "φ2") in the aforementioned embodiments. Such a configuration as to provide the complementary gate drive signals ("φ1" and "φ2") with so-called dead time in supplying them to the switched capacitor power supply circuit unit 10 may be contemplated. This is aimed at avoiding a situation where the switching elements (not illustrated) serially connected between an input terminal 1 of the switched capacitor power supply circuit unit 10 and the ground or between its output terminal 2 and the ground turn on at the same time to let shoot-through current flow. A dead time generating circuit (not illustrated) may be provided in the clock management circuit 20 or the gate drive circuit 22.

In accordance with this embodiment, control in synchronization with the clock signal "CLK" is performed. Specifically, the control operation is conducted for only a period of time under control by the clock signal "CLK", and thereby, consumed power can be reduced.

Fifth Embodiment

Figure 8:
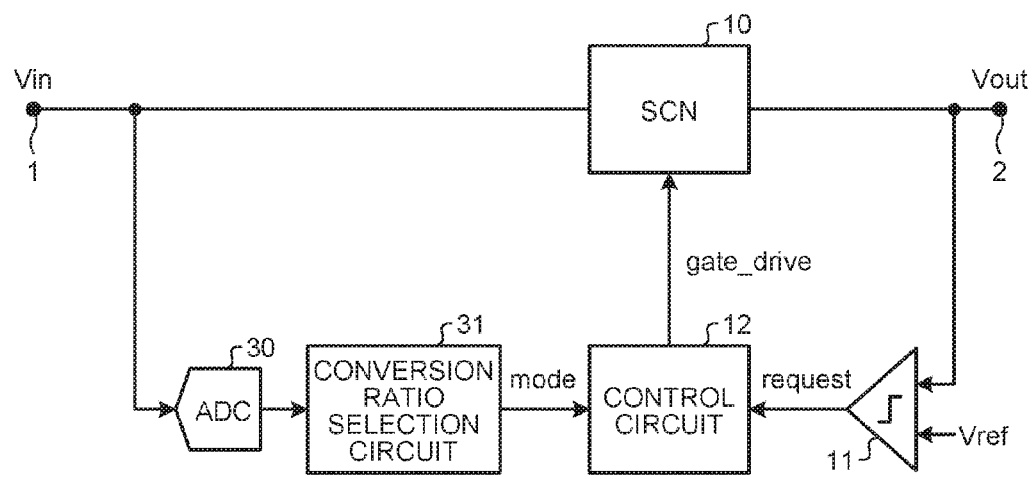
FIG. 8 is a diagram illustrating a configuration of a switched capacitor power supply circuit according to a fifth embodiment.

FIG. 8 is a diagram illustrating a configuration of a switched capacitor power supply circuit according to a fifth embodiment. Elements corresponding to those of the aforementioned embodiments are denoted by the same reference symbols. This embodiment includes an AD converter 30 supplied with a DC input voltage Vin. The AD converter 30 converts the DC input voltage Vin to a digital value and then supplies it to a conversion ratio selection circuit 31.

The conversion ratio selection circuit 31 selects the conversion ratio according to an input signal from the AD converter 30. The conversion ratio is, as illustrated in FIG. 5, selected according to which range of voltage levels the input voltage Vin falls in, and a signal "mode" indicating the selected conversion ratio is supplied to a control circuit 12. For example, the conversion ratio selection circuit 31 may have a table of the correspondence of the input voltage $V_{in}$ to the conversion ratio and select the conversion ratio according to the input voltage $V_{in}$.

A comparator circuit 11 compares an output voltage Vout with a reference voltage Vref, and when the output voltage Vout becomes lower than the reference voltage Vref, for example, it supplies an output signal "request" of High-level to the control circuit 12.

In response to a signal "mode" from the conversion ratio selection circuit 31, the control circuit 12 supplies the switched capacitor power supply circuit unit 10 with gate control signals ("on" and "off") enabling it to select and set the conversion ratio for the switched capacitor power supply circuit unit 10 to a predetermined conversion ratio and a gate signal "gate_drive" that includes gate drive signals ("φ1" and "φ2") enabling the switched capacitor power supply circuit unit 10 to charge/discharge so as to step up the output voltage Vout according to the conversion ratio.

In accordance with this embodiment, the conversion ratio for the switched capacitor power supply circuit unit 10 is appropriately selected in order to obtain the desired output voltage Vout according to a level of the input voltage Vin. In other words, the conversion ratio is appropriately selected according to the input voltage Vin to output the output voltage Vout approximate to the desired voltage level, thereby suppressing a loss. In this manner, the converting efficiency can be retained at high level. Using the switched capacitor power supply circuit unit 10 of the aforementioned first embodiment for that of this embodiment, nine variations, for example, of the conversion ratio providing for voltage step-up to voltage step-down can be used to conduct control according to the input voltage Vin. Additionally, when the output voltage Vout becomes lower than the reference voltage Vref, the gate drive signals ("φ1" and "φ2") that enable the switched capacitor power supply circuit unit 10 to charge/discharge so as to step up the output voltage Vout is supplied, and therefore, control of retaining the output voltage Vout at the level of the reference voltage Vref can be conducted at the same time.

Sixth Embodiment

Figure 9:
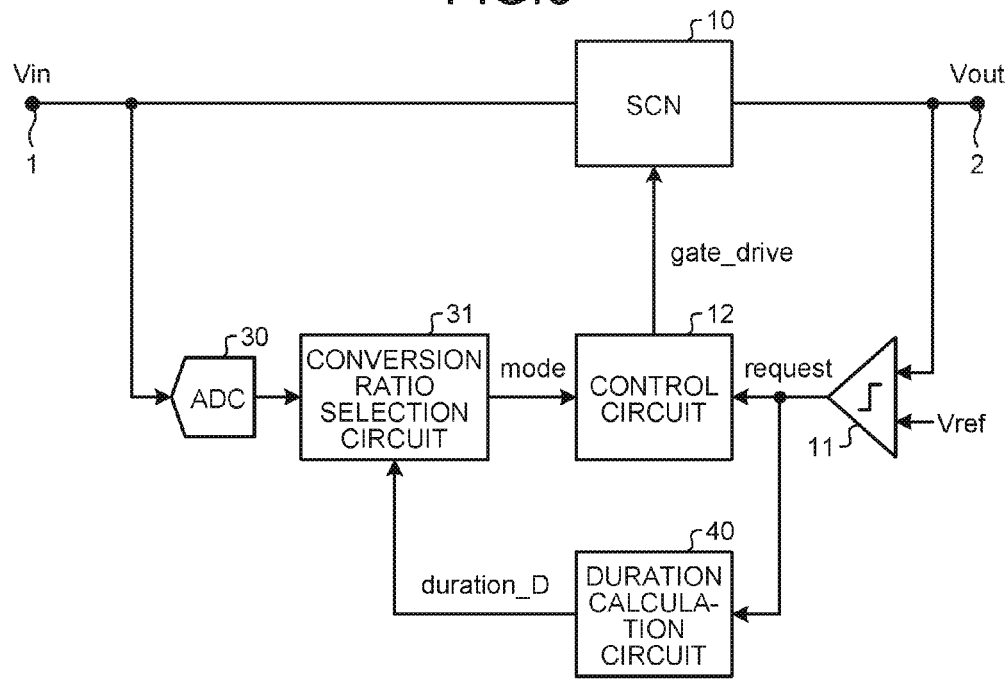
FIG. 9 is a diagram illustrating a configuration of a switched capacitor power supply circuit according to a sixth embodiment.

FIG. 9 is a diagram illustrating a configuration of a switched capacitor power supply circuit according to a sixth embodiment. Elements corresponding to those of the aforementioned embodiments are denoted by the same reference symbols. This embodiment includes a duration calculation circuit 40 to which an output signal "request" is supplied from a comparator circuit 11.

The duration calculation circuit 40 calculates a length of duration for which the output signal "request" from the comparator circuit 11 is in a High-level state, and outputs a duration signal "duration_D" indicating the duration. The duration signal "duration_D" is supplied to a conversion ratio selection circuit 31.

Figure 10:
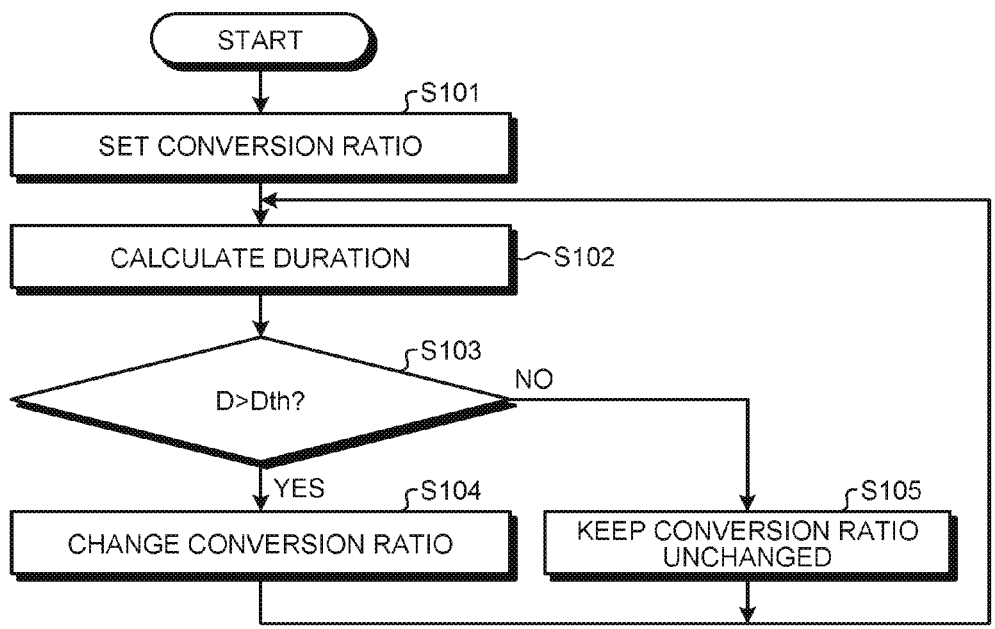
FIG. 10 is a diagram illustrating a flow of the control of the embodiment in FIG. 9.

FIG. 10 is a diagram illustrating a flow of the control of this embodiment. In this embodiment, although the aforementioned control according to the input voltage Vin in the fifth embodiment is also conducted at the same time, control unique to this embodiment alone will be discussed, for the sake of convenience. A conversion ratio for a switched capacitor power supply circuit unit 10 is set to a predetermined value according to the input voltage Vin (S101). The duration for which the output signal "request" from the comparator circuit 11 continues to be of High-level, namely, a length of a duration D for which an output voltage Vout stays below a reference voltage Vref is calculated (S102). The duration D and a threshold duration Dth are compared (S103), and the conversion ratio is varied when the duration D is longer than the predetermined threshold duration Dth (S104). When the duration D is longer than the predetermined threshold duration Dth, a decision of high-load is made, and the conversion ratio is varied to step up the output voltage Vout, for example. When the duration D is not longer than the predetermined threshold duration Dth, the current conversion ratio keeps unchanged (S105).

In this embodiment, in addition to the control of setting the conversion ratio according to the input voltage Vin, the control of changing the conversion ratio according to the output voltage Vout can be conducted at the same time. Hence, depending upon the state of a load, the control of the output voltage Vout can be rapidly conducted.

Seventh Embodiment

Figure 11:
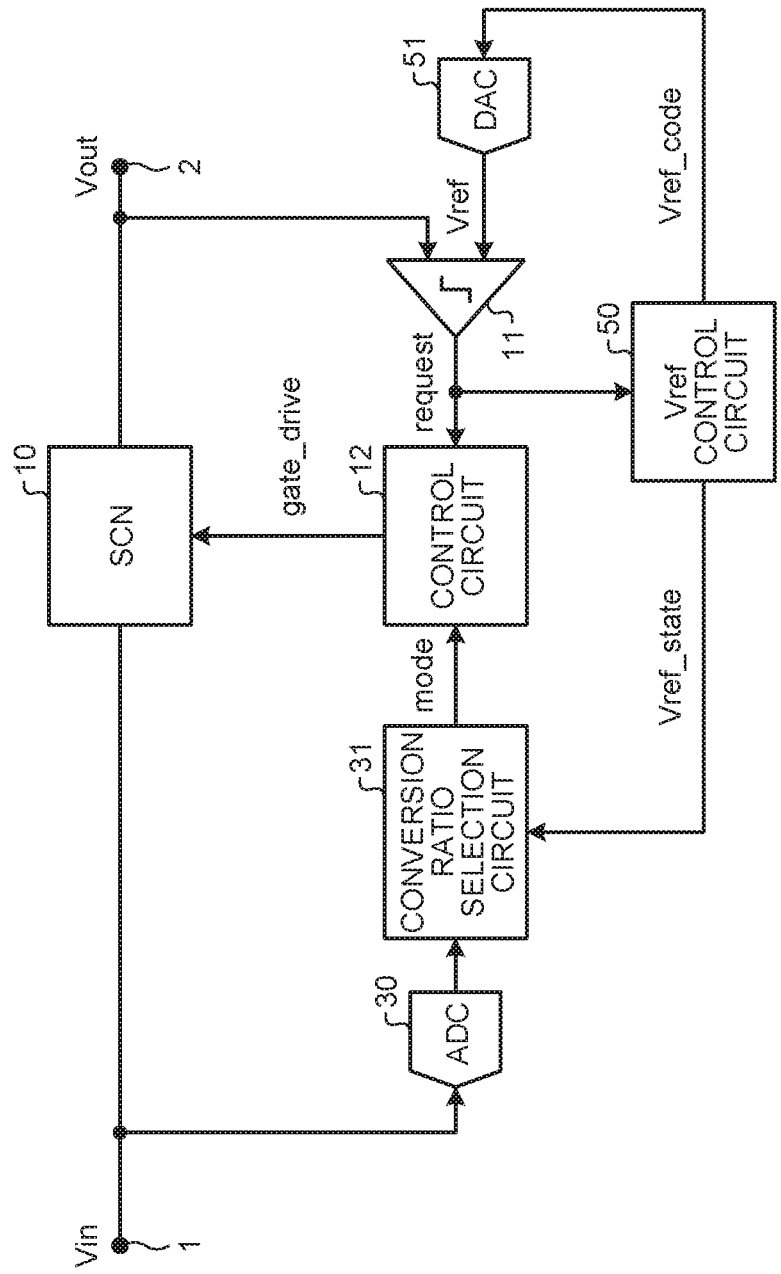
FIG. 11 is a diagram illustrating a configuration of a switched capacitor power supply circuit according to a seventh embodiment.

FIG. 11 is a diagram illustrating a configuration of a switched capacitor power supply circuit according to a seventh embodiment. Elements corresponding to those of the aforementioned embodiments are denoted by the same reference symbols. This embodiment includes a Vref control circuit 50 supplied with an output signal "request" from a comparator circuit 11. The Vref control circuit 50 outputs a control signal "Vref_code" to control a reference voltage Vref. The control signal "Vref_code" is supplied to a DA converter 51. The DA converter 51 supplies the comparator circuit 11 with the reference voltage Vref according to the control signal "Vref_code".

The Vref control circuit 50 supplies a conversion ratio selection circuit 31 with a set signal "Vref_state" that sets the conversion ratio according to the state of the reference voltage Vref.

Figure 12:
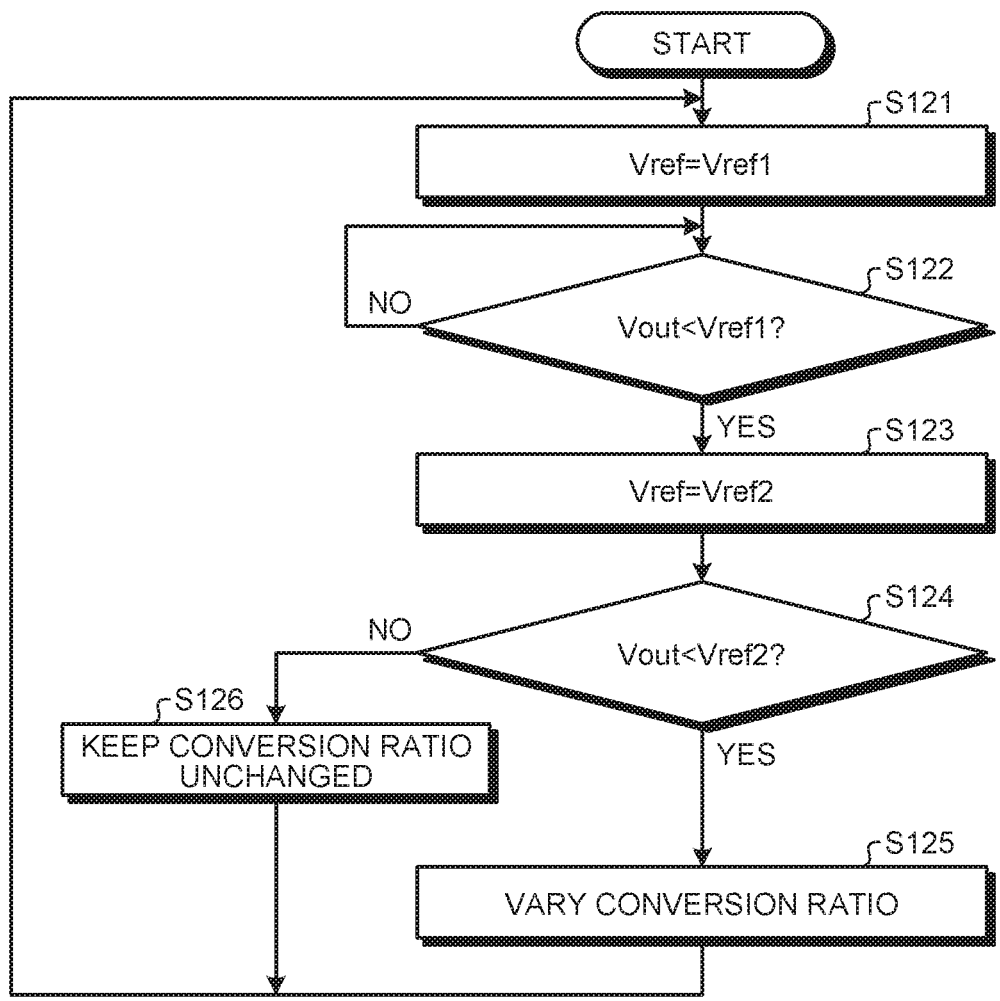
FIG. 12 is a diagram illustrating a flow of the control of the embodiment in FIG. 11.

FIG. 12 illustrates a flow of the control of this embodiment. In this embodiment, although the aforementioned control according to the input voltage Vin in the fifth embodiment is also conducted at the same time, control unique to this embodiment alone will be discussed, for the sake of convenience. For example, the reference voltage Vref is set to the reference voltage Vref1 (S121). The output voltage Vout is compared with the reference voltage Vref1 (S122). When the output voltage Vout becomes lower than the reference voltage Vref1, the reference voltage Vref is varied to a reference voltage Vref2 (S123). The reference voltage Vref2 is a voltage lower than the reference voltage Vref1. The output voltage Vout is compared with the reference voltage Vref2 (S124). When the output voltage Vout is lower than the reference voltage Vref2, the conversion ratio is varied (S125). When the output voltage Vout is lower than the reference voltage Vref2, a decision of high-load is made, and the conversion ratio is varied to a rate to step up the output voltage Vout. The conversion ratio is varied, and the reference voltage Vref is set back to the reference voltage Vref1. When the output voltage Vout is not lower than the reference voltage Vref2, the current conversion ratio keeps unchanged (S126), yet the reference voltage Vref is set back to the reference voltage Vref1. When the output voltage Vout becomes lower than the reference voltage Vref1, the output signal "request" is supplied from the comparator circuit 11 to a control circuit 12, and gate drive signals ("φ1" and "φ2", not illustrated) are supplied to the switched capacitor power supply circuit unit 10 to enable the switched capacitor power supply circuit unit 10 to charge/discharge, thereby conducting control of stepping up the output voltage Vout according to the conversion ratio, which is similar to the aforementioned embodiments.

In this embodiment, in addition to the control of setting the conversion ratio according to the input voltage Vin, the control of changing the conversion ratio according to the state of the output voltage Vout can be conducted at the same time. When the output voltage Vout becomes lower than the initial reference voltage Vref1, the reference voltage Vref1 is varied to the reference voltage Vref2 lower than the reference voltage Vref1, and then, a decision of high-load or not is made. When the output voltage Vout becomes lower than the reference voltage Vref2, a decision of high-load is made, and the conversion ratio is varied to step up the output voltage Vout. Changing the conversion ratio only when the decision of high-load is made, it becomes possible to retain the converting efficiency at high level by keeping the conversion ratio unchanged as much as possible from the value initially set based upon a relation between the input voltage Vin and the desired output voltage Vout. Such a configuration as to switch the reference voltage Vref supplied to the comparator circuit 11 brings about simplification of the circuit structure because the single comparator circuit 11 performs comparisons among the two reference voltages (Vref1 and Vref2) and the output voltage Vout, and furthermore, the configuration composed of the single comparator circuit 11 brings about reduction in consumed power. When the output voltage Vout becomes lower than the reference voltage Vref1, the control circuit 12 supplies the gate drive signals ("φ1" and "φ2") in response to the output signal "request" from the comparator circuit 11 and enables the switched capacitor power supply circuit unit 10 to charge/discharge, thereby conducting the control of stepping up the output voltage Vout according to the conversion ratio.

Eighth Embodiment

Figure 13:
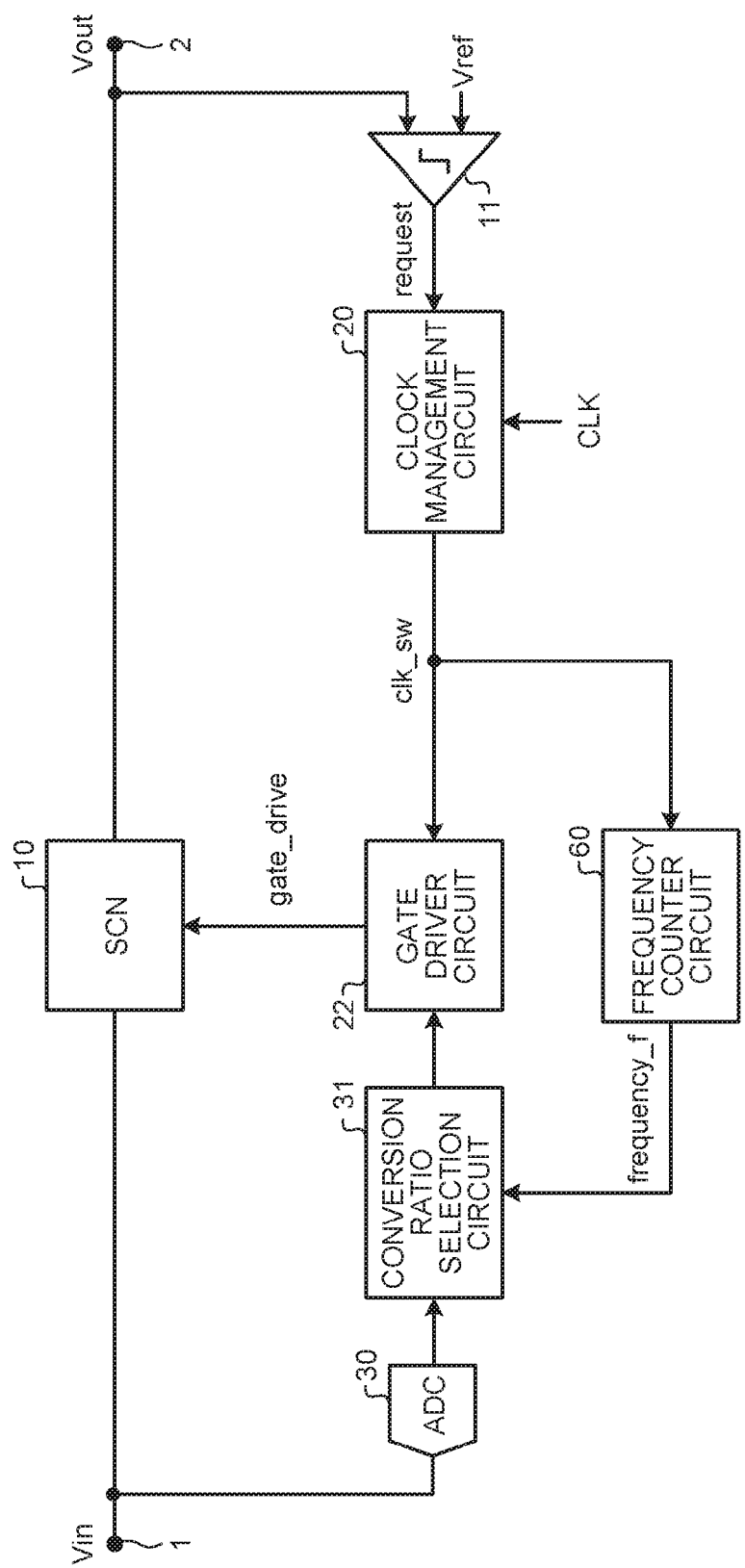
FIG. 13 is a diagram illustrating a configuration of a switched capacitor power supply circuit according to an eighth embodiment.

FIG. 13 is a diagram illustrating a configuration of a switched capacitor power supply circuit according to an eighth embodiment. Elements corresponding to those of the aforementioned embodiments are denoted by the same reference symbols. This embodiment includes a frequency counter circuit 60 supplied with a clock output signal "clk_sw" from a clock management circuit 20. The frequency counter circuit 60 counts a frequency f of the clock output signal "clk_sw" from the clock management circuit 20 and compares it with a predetermined threshold frequency fth to supply a conversion ratio selection circuit 31 with a control signal "frequency_f" according to the comparison result. The clock output signal "clk_sw" is produced in response to an output signal "request" from a comparator circuit 11 that compares an output voltage Vout and a reference voltage Vref. Thus, the frequency f of the clock output signal "clk_sw" indicates, for example, the number of times by which the output voltage Vout has become lower than the reference voltage Vref in a unit time.

Figure 14:
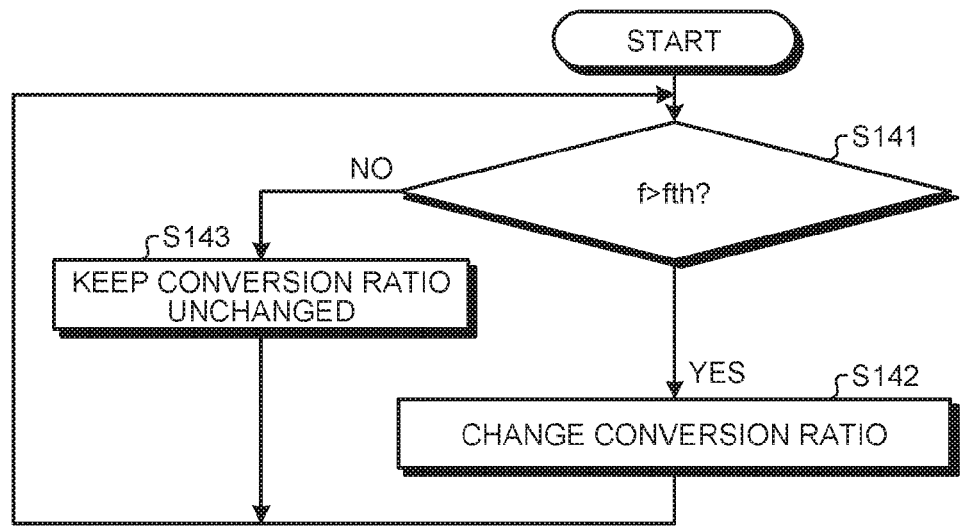
FIG. 14 is a diagram illustrating a flow of the control of the embodiment in FIG. 13.

FIG. 14 illustrates a flow of the control of this embodiment. In this embodiment, although the aforementioned control of setting the conversion ratio according to the input voltage Vin in the fifth embodiment is conducted at the same time, control unique to this embodiment alone will be discussed, for the sake of convenience. The frequency f of the clock output signal "clk_sw" from the clock management circuit 20 is compared with the predetermined threshold frequency fth (S141). When the frequency f is higher than the threshold frequency fth, the converting rage is varied (S142). When the frequency f is higher than the threshold frequency fth, which indicates that the output voltage Vout has become lower than the reference voltage Vref more often, a decision of high-load is therefore made, and the control of changing the conversion ratio to step up the output voltage Vout is conducted. When the frequency f does not exceed the threshold frequency fth, the current conversion ratio keeps unchanged (S143).

In this embodiment, in addition to the control of setting the conversion ratio according to the input voltage Vin, the control of changing the conversion ratio according to the state of the output voltage Vout can be conducted at the same time. When the frequency f of the clock output signal "clk_sw" indicating the number of times by which the output voltage Vout has become lower than the reference voltage Vref becomes greater than the predetermined threshold frequency fth, the output voltage Vout can be stepped up rapidly under the condition of high-load and retained at the reference voltage Vref by changing the conversion ratio to step up the output voltage Vout.

Ninth Embodiment

Figure 15:
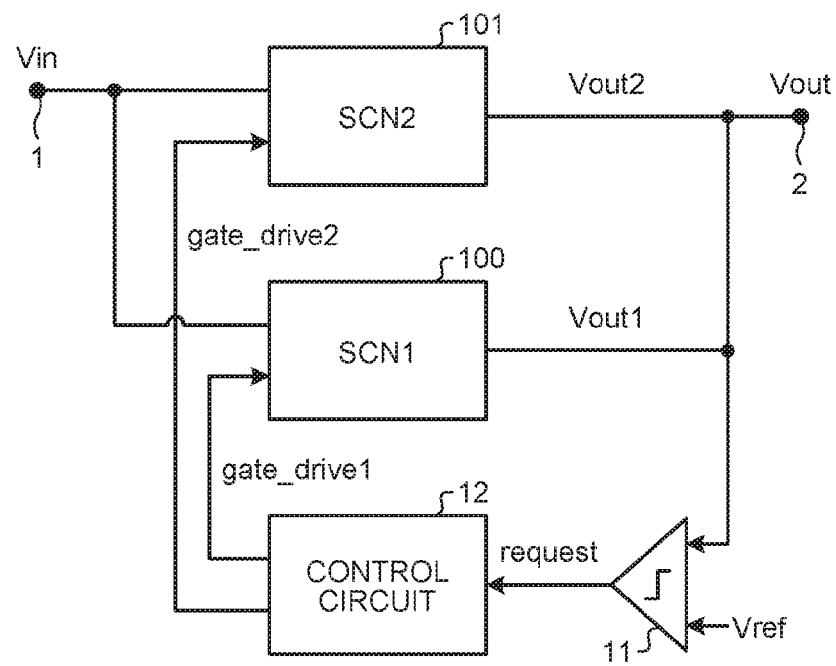
FIG. 15 is a diagram illustrating a configuration of a switched capacitor power supply circuit according to a ninth embodiment.

FIG. 15 is a diagram illustrating a configuration of a switched capacitor power supply circuit according to a ninth embodiment. Elements corresponding to those of the aforementioned embodiments are denoted by the same reference symbols. This embodiment includes first and second switched capacitor power supply circuit units 100 and 101. Each of the switched capacitor power supply circuit units 100 and 101 can be formed of the aforementioned switched capacitor power supply circuit unit 10 of the embodiment illustrated in FIG. 1.

A comparator circuit 11 compares the output voltage Vout with the reference voltage Vref, and, for example, when the output voltage Vout becomes lower than the reference voltage Vref, it produces an output signal "request" of High-level. A control circuit 12 generates first and second gate signals ("gate_drive1" and "gate_drive2"). The first gate signal "gate_drive1" is supplied to the first switched capacitor power supply circuit unit 100, and the second gate signal "gate_drive2" is supplied to the second switched capacitor power circuit unit 101. The first and second gate signals ("gate_drive1" and "gate_drive2") include gate drive signals ("φ1" and "φ2", not illustrated) that are complementary to each other. The first and second switched capacitor power supply circuit units 100 and 101 respectively, in response to first and second gate signals ("gate_drive1" and "gate_drive2"), operate to charge/discharge so as to retain their respective output voltages (Vout1 and Vout2) at the reference voltage Vref.

In this embodiment, the first and second switched capacitor power supply circuit units 100 and 101 have their respective outputs added and supplied to an output terminal 2. Enabling the plurality of the switched capacitor power supply circuit units 100 and 101 to operate in parallel and have their respective output currents added up can results in a greater sum of the output current being supplied to a load.

Tenth Embodiment

Figure 16:
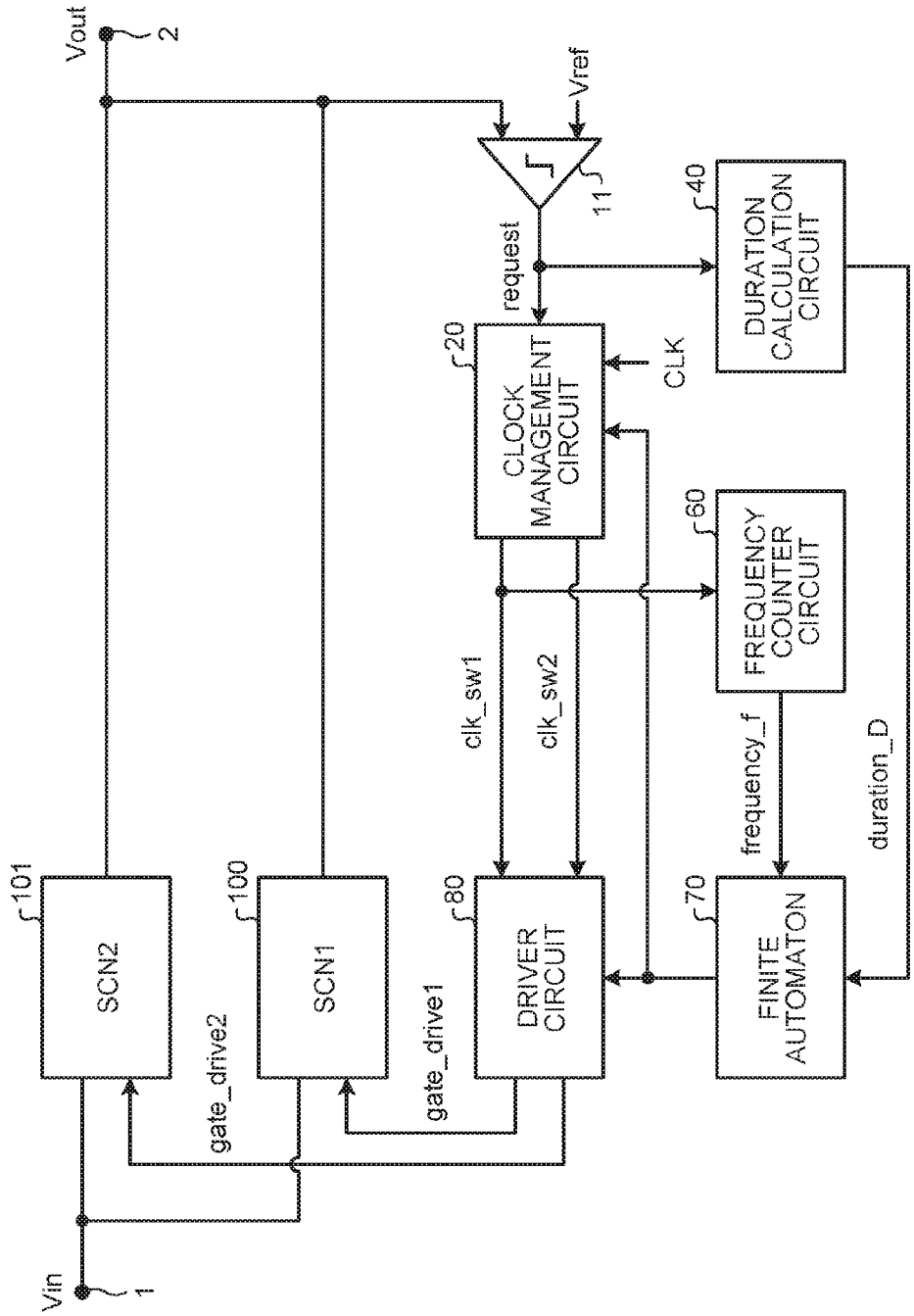
FIG. 16 is a diagram illustrating a configuration of a switched capacitor power supply circuit according to a tenth embodiment.

FIG. 16 is a diagram illustrating a configuration of a switched capacitor power supply circuit according to a tenth embodiment. Elements corresponding to those of the aforementioned embodiments are denoted by the same reference symbols. This embodiment includes a duration calculation circuit 40 that calculates a duration D for which an output signal "request" from a comparator 11 continues to be of High-level. For example, the output signal "request" turns to High-level when an output voltage Vout is lower than a reference voltage Vref. The duration calculation circuit 40 supplies the calculation result or a duration signal "duration_D" to a finite automaton 70.

A clock management circuit 20 outputs first and second clock output signals ("clk_sw1" and "clk_sw2"). A driver circuit 80 generates first and second gate signals ("gate_drive1" and "gate_drive2") in response to the first and second clock output signals ("clk_sw1" and "clk_sw2") and supplies them to first and second switched capacitor power supply circuit units 100 and 101, respectively. The first and second gate signals ("gate_drive1" and "gate_drive2") respectively include the complementary gate drive signals ("φ1" and "φ2") in the aforementioned embodiments.

A frequency counter circuit 60 counts, for example, a frequency f of the first clock output signal "clk_sw1" and outputs the count result as a frequency signal "frequency_f" to supply it to the finite automaton 70.

The finite automaton 70 saves, for example, a threshold duration Dth of the duration D and a threshold frequency fth of the frequency f and compares the duration D indicated by the duration signal "duration_D" and the frequency f indicated by the frequency signal "frequency_f" with their respective thresholds (Dth and fth). The finite automaton 70 controls the driver circuit 80 and the clock management circuit 20 according to the comparison results.

Figure 17:
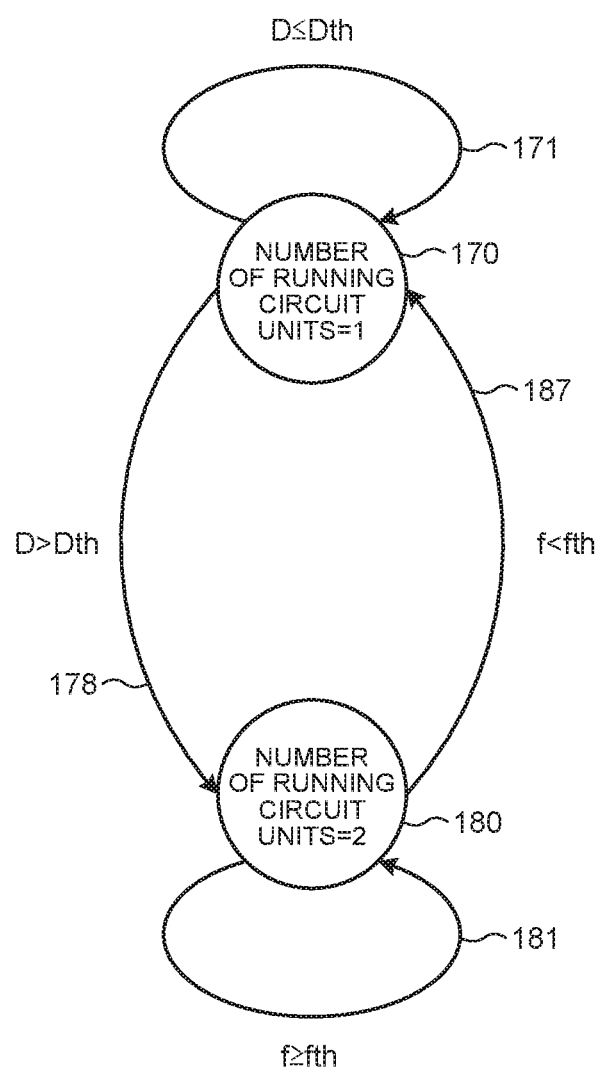
FIG. 17 is a diagram illustrating a state transition of control of the embodiment in FIG. 16.

A control method of this embodiment will be discussed with reference to FIG. 17. FIG. 17 is a diagram illustrating its state transition. In the ordinary state, for example, the switched capacitor power supply circuit unit 100 alone is enabled to operate (170). When the duration D is equal to or shorter than the threshold duration Dth, a state of the single operation of the switched capacitor power supply circuit unit 100 is retained (171).

When the duration D is longer than the threshold duration Dth (178), the switched capacitor power supply circuit unit 101 is also enabled to operate, and a transition is made to parallel operation by two of the running circuit units (180). Because the duration D indicates a length of time for which the output voltage Vout stays below the reference voltage Vref, when the duration D becomes longer than the predetermined threshold duration Dth and when a length of time for which the output voltage Vout stays below the reference voltage Vref is prolonged, high-load is proclaimed, and the control of transition to the parallel operation is conducted.

When the frequency f of the clock output signal "clk_sw1" is equal to or higher than the threshold frequency fth, the parallel operation continues (181). When the frequency f of the clock output signal "clk_sw1" is lower than the threshold frequency fth (187), a transition to the single operation is made (170). Because the frequency f of the clock output signal "clk_sw1" indicates the number of times by which the output voltage Vout has become lower than the reference voltage Vref in a unit period of time, when the frequency f of the clock signal "clk_sw1" becomes lower than the threshold frequency fth and when the output voltage Vout stays less below the reference voltage Vref, a decision of underload is made, and the control of transition to the single operation is conducted. For example, in the event of the single operation of the switched capacitor power supply circuit unit 100, the finite automaton 70 controls the clock management circuit 20 to stop the generation of the second clock output signal "clk_sw2", and in order to make a transition to the parallel operation, it controls the same to restart the generation of the second clock output signal "clk_sw2".

In accordance with this embodiment, the control of switching between the single operation and the parallel operation according to the state of the output voltage Vout can be conducted. In the high-load state, a transition is made to the parallel operation, and thereby, the output current can be increased and supplied to a load (not illustrated). Also, it is decided from the duration D whether or not a transition from the single operation to the parallel operation is made, and it is decided from the frequency f whether or not a transition from the parallel operation to the single operation is made. Although it is hard to calculate the duration D when it is shortened, it is relatively easy to count the frequency f of the clock output signal "clk_sw1", for example, by using a counter (not illustrated) even when it is reduced, and thus, the frequency f is effective as a reference value in deciding a transition from the parallel operation to the single operation.

Eleventh Embodiment

Figure 18:
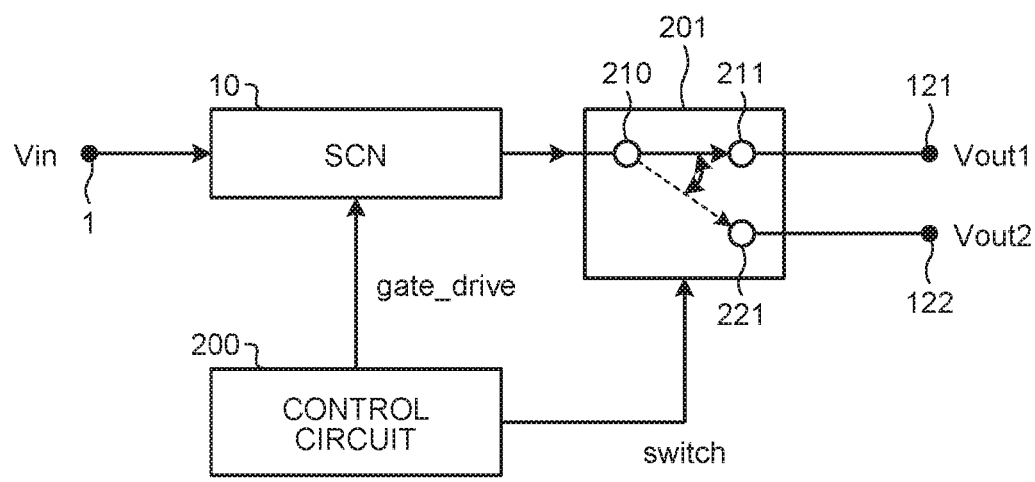
FIG. 18 is a diagram illustrating a configuration of a switched capacitor power supply circuit according to an eleventh embodiment.

FIG. 18 is a diagram illustrating a configuration of a switched capacitor power supply circuit according to an eleventh embodiment. Elements corresponding to those of the aforementioned embodiments are denoted by the same reference symbols. This embodiment includes a switch circuit 201 that receives an output from a switched capacitor power supply circuit unit 10. The switch circuit 201 switches a connection destination of its first input node 210 in response to a switch signal "switch" from a control circuit 200 and switches a supply destination of the output voltage Vout from the switched capacitor power supply circuit unit 10 between first and second output nodes 211 and 221 to supply the output voltage Vout. The first output node 211 is connected to a first output terminal 121 while the second output node 221 is connected to a second output terminal 122. A first output voltage Vout1 is supplied from the first output terminal 121 to a first load (not illustrated) while a second output voltage Vout2 is supplied from the second output terminal 122 to a second load (not illustrated).

The control circuit 200 generates a gate signal "gate_drive" enabling the switched capacitor power supply circuit unit 10 to operate and supplies it to the switched capacitor power supply circuit unit 10. The gate signal "gate_drive" is designed, for example, to include gate control signals ("on" and "off") to set the conversion ratio for the switched capacitor power supply circuit unit 10. When the first output voltage Vout1 output from the first output terminal 121 and the second output voltage Vout2 output from the second output terminal 122 are set to different voltages, such a configuration as to supply the switched capacitor power supply circuit unit 10 with a gate signal "gate_drive" that includes the gate control signals ("on" and "off") to set the conversion ratio for the switched capacitor power supply circuit unit 10 to a varied value according to the timing of switching the connection destination of the first input node 210 in the switch circuit 201 may be contemplated.

The gate signal "gate_drive" supplied from the control circuit 200 includes the gate drive signals ("φ1" and "φ2") that turn to High-level in a complementary manner to each other. Supplied with the gate signal "gate_drive", the switched capacitor power supply circuit unit 10 operates to charge/discharge and steps up the output voltage according to the conversion ratio.

In accordance with this embodiment, the switched capacitor power supply circuit unit 10, shared by the plurality of the output terminals (121 and 122), can supply its output voltage in a time-division format to the output terminals and supply a plurality of loads with output voltages (Vout1 and Vout2). Also, on switching the supply destination of the output voltage from the switched capacitor power supply circuit unit 10, the control of changing the conversion ratio for the switched capacitor power supply circuit unit 10 is conducted, and thereby, for example, the output voltages (Vout1 and Vout2) of different voltage levels according to the loads can be supplied.

Twelfth Embodiment

Figure 19:
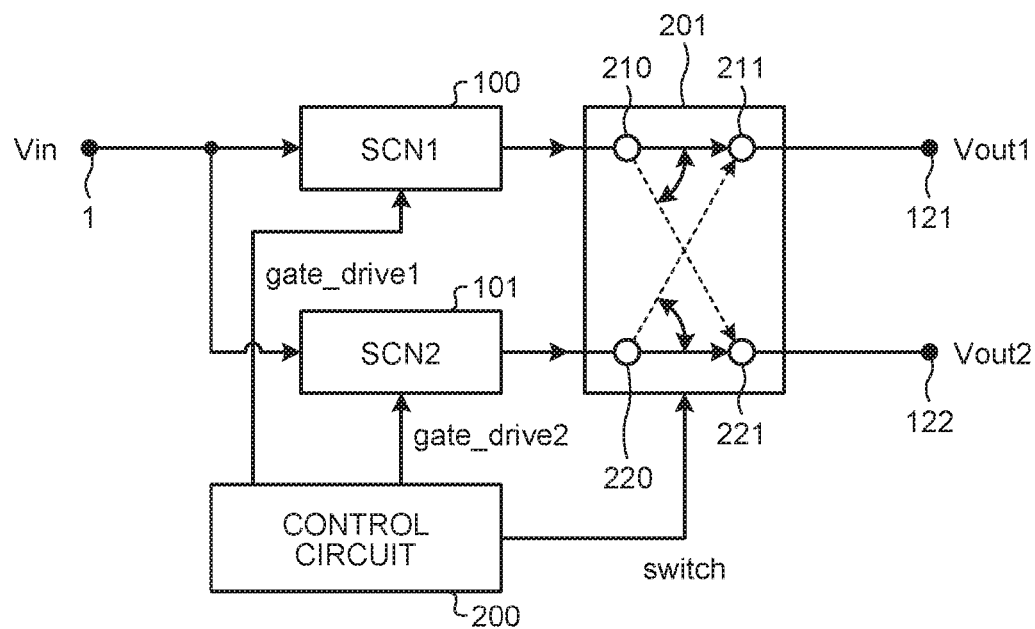
FIG. 19 is a diagram illustrating a configuration of a switched capacitor power supply circuit according to a twelfth embodiment.

FIG. 19 is a diagram illustrating a configuration of a switched capacitor power supply circuit according to a twelfth embodiment. Elements corresponding to those of the aforementioned embodiments are denoted by the same reference symbols. This embodiment includes first and second switched capacitor power supply circuit units 100 and 101. The first and second switched capacitor power supply circuit units 100 and 101 have their respective outputs supplied to a switch circuit 201. The switch circuit 201 switches connection destinations of first and second input nodes 210 and 220 between first and second output nodes 211 and 221 in response to a switch signal "switch" from a control circuit 200.

The control circuit 200 generates a first gate signal "gate_drive1" enabling the first switched capacitor power supply circuit unit 100 to operate and a second gate signal "gate_drive2" enabling the second switched capacitor power supply circuit unit 101 to operate and supplies them to the first and second switched power supply circuit units 100 and 101, respectively.

The first gate signal "gate_drive1" supplied from the control circuit 200 and the second gate signal "gate_drive2" enabling the second switched capacitor power supply circuit unit 101 to operate include gate drive signals ("φ1" and "φ2") that turn to High-level in a complementary manner to each other. Supplied with the first and second gate signals ("gate_drive1" and "gate_drive2"), the first and second switched capacitor power supply circuit units 100 and 101 respectively operate to charge/discharge and step up their respective output voltages according to the conversion ratio.

In accordance with this embodiment, for example, when a load (not illustrated) connected to the first output terminal 121 is a high-load, parallel operation where the first and second switched capacitor power supply circuit units 100 and 101 are running enables supply of the output voltage Vout1 to the first output terminal 121 while single operation where either of the switched capacitor power supply circuit units (100 and 101) is running enables supply of the second output voltage Vout2 to the second output terminal 122. Adopting the parallel operation, output current in the situation of high-load can be increased and supplied. Contrarily, in the situation of light-load, adopting the single operation brings about a reduction in number of the running switched capacitor power supply circuit units (100 and 101), and thereby, reduced power consumption is expected. Moreover, another configuration may be contemplated where the first and second gate signals ("gate_drive1" and "gate_drive2") include gate control signals ("on" and "off") to change the conversion ratio so that the first and second switched capacitor power supply circuit units 100 and 101 have their respective output voltages varied from each other. Configured to produce the varied output voltages, the first and second switched capacitor power supply circuit units 100 and 101 are more versatile in combinations of their outputs, which enables finer control according to the state of the load.

Thirteenth Embodiment

Figure 20:
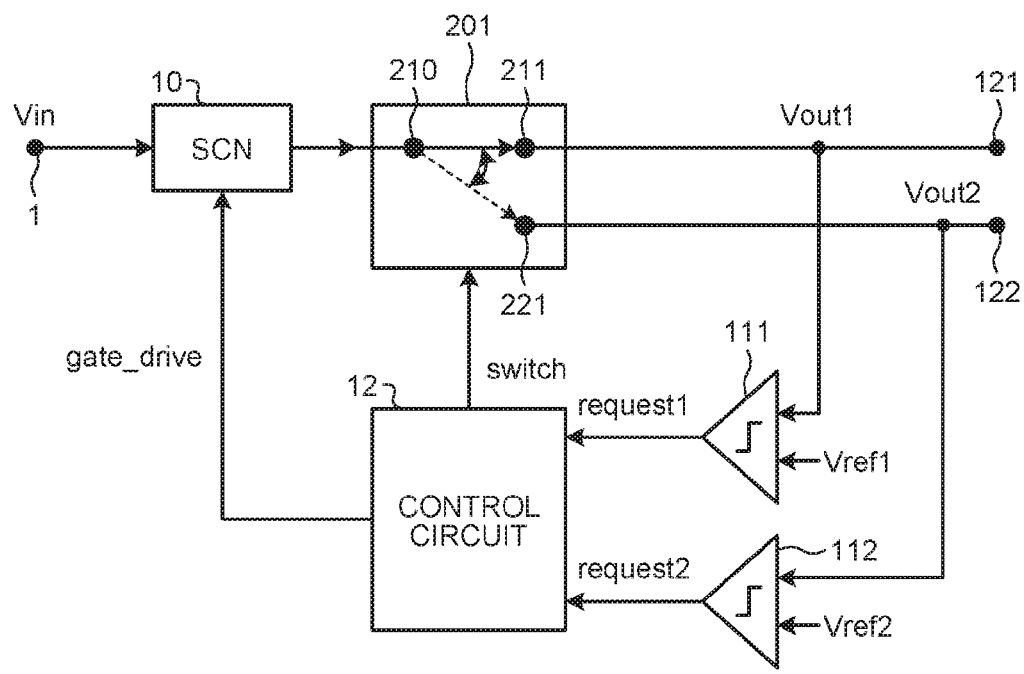
FIG. 20 is a diagram illustrating a configuration of a switched capacitor power supply circuit according to a thirteenth embodiment.

FIG. 20 is a diagram illustrating a configuration of a switched capacitor power supply circuit according to a thirteenth embodiment. Elements corresponding to those of the aforementioned embodiments are denoted by the same reference symbols. This embodiment includes a first comparator circuit 111 that compares an output voltage Vout1 at a first output terminal 121 with a first reference voltage Vref1 and a second comparator circuit 112 that compares an output voltage Vout2 at a second output terminal 122 with a second reference voltage Vref2. The first comparator circuit 111 produces, for example, an output signal "request1" of High-level when the first output voltage Vout1 becomes lower than the first reference voltage Vref1. The second comparator circuit 112 produces, for example, an output signal "request2" of High-level when the second output voltage Vout2 becomes lower than the second reference voltage Vref2. The output signal "request1" from the first comparator circuit 111 and the output signal "request2" from the second comparator circuit 112 are supplied to a control circuit 12.

The control circuit 12 supplies a switch circuit 201 with a switch signal "switch" that enables the switch circuit 201 to switch a connection destination of its first input node 210 between first and second output nodes 211 and 221. When the first input node 210 is connected to the first output node 211, a comparison is made between the first output voltage Vout1 and the first reference voltage Vref1, and when the first input node 210 is connected to the second output node 221, a comparison is made between the second output voltage Vout2 and the second reference voltage Vref2. The first and second comparator circuits 111 and 112 produces the output signals ("request1" and "request2") according to the comparison results.

The control circuit 12 generates a gate signal "gate_drive" enabling the switched capacitor power supply circuit unit 10 to operate and supplies it to a switched capacitor power supply circuit unit 10. The gate signal "gate_drive" supplied by the control circuit 12 include gate drive signals ("φ1" and "φ2") that turn to High-level in a complementary manner to each other. Supplied with the gate signal "gate_drive", the switched capacitor power supply circuit unit 10 operates to charge/discharge and sets up the output voltage according to the conversion ratio.

In accordance with this embodiment, the single switched capacitor power supply circuit unit 10 can have its output voltage supplied in a time-division format to the first and second output terminals 121 and 122 via the switch circuit 201. Thus, the output voltages (Vout1 and Vout2) can be supplied to a plurality of loads (not illustrated) individually according to the states of the loads. Such control that the output voltages (Vout1 and Vout2) are compared with their respective reference voltages (Vref1 and Vref2) and that when the output voltages (Vout1 and Vout2) become lower than their respective reference voltages (Vref1 and Vref2), the switched capacitor power supply circuit unit 10 can have its output voltage stepped up to retain the output voltages (Vout1 and Vout2) at the reference voltages (Vref1 and Vref2) may be contemplated. Also, combined with any other control of the aforementioned embodiments, for example, such a control that, upon switching a connection destination of the first input node 210, the conversion ratio for the switched capacitor power supply circuit unit 10 is varied according to the switching may be contemplated. A configuration may be contemplated where information of the conversion ratio when the first input node 210 once was connected to the first or second output node 211 or 221 together with information of the connection destination have been saved in the control circuit 12, and the conversion ratio for the switched capacitor power supply circuit unit 10 is varied according to the information of the conversion ratio saved at the time of switching the connection destination of the first input node 210 between the first and second output nodes 211 and 221. In such a situation, the gate signal "gate_drive" output from the control circuit 12 is designed to include gate control signals ("on" and "off") to change the conversion ratio for the switched capacitor power supply circuit unit 10. As described with reference to FIG. 2, the conversion ratio can be varied by changing a combination of the gate control signals ("on" and "off") supplied to switching elements (S1 to S13) the switched capacitor power supply circuit unit 10 is composed of.

Fourteenth Embodiment

Figure 21:
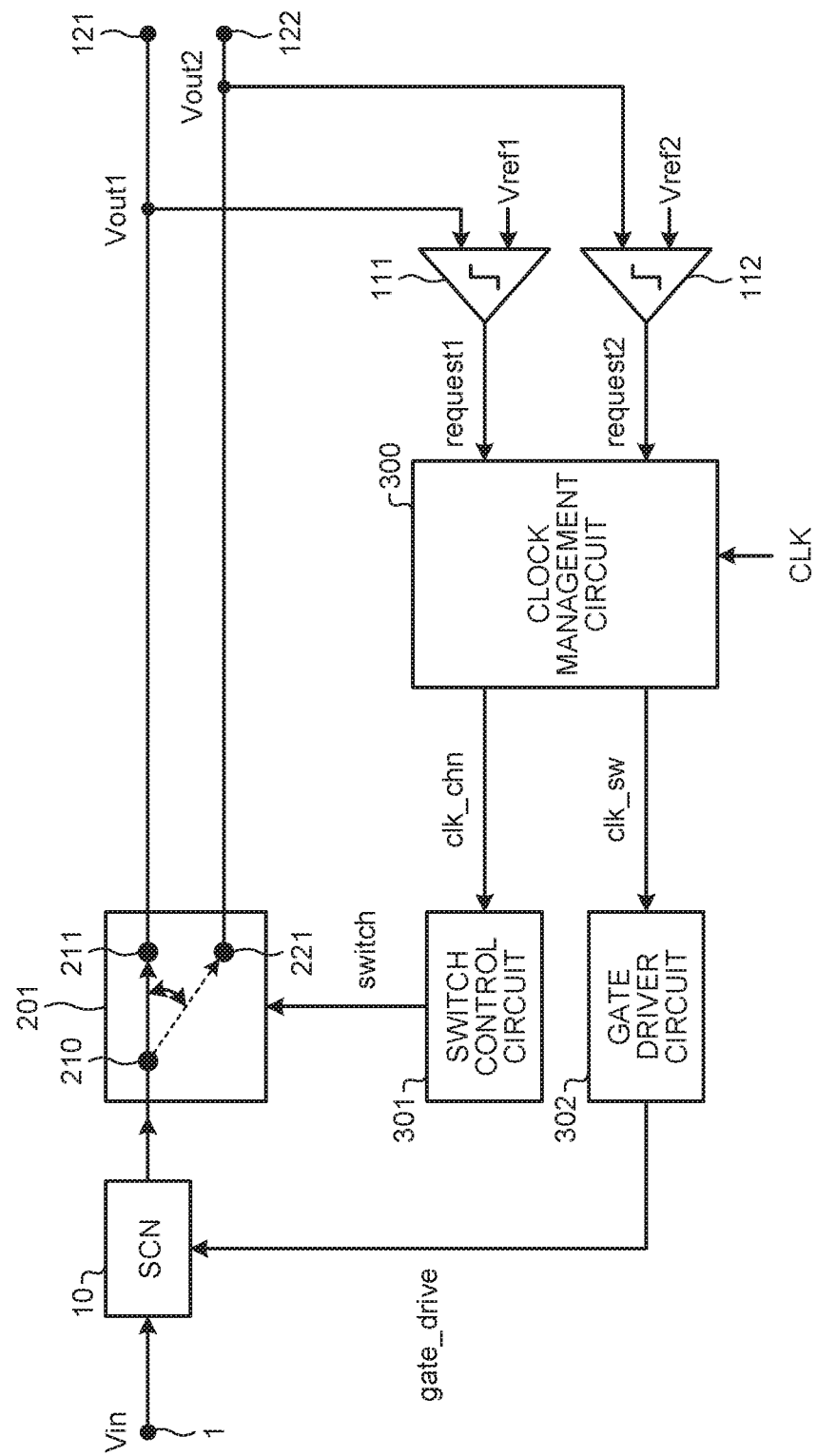
FIG. 21 is a diagram illustrating a configuration of a switched capacitor power supply circuit according to a fourteenth embodiment.

FIG. 21 is a diagram illustrating a configuration of a switched capacitor power supply circuit according to a fourteenth embodiment. Elements corresponding to those of the aforementioned embodiments are denoted by the same reference symbols. This embodiment includes a clock management circuit 300 supplied with an output signal "request1" from a first comparator circuit 111 and an output signal "request2" from a second comparator circuit 112. The clock management circuit 300 is supplied with a clock signal "CLK" and operates only during the continuing supply with the clock signal "CLK".

The clock management circuit 300 generates a switch clock signal "clk_chn" enabling a switch circuit 201 to switch a connection destination of its first input node 210 and supplies it to a switch control circuit 301. The switch control circuit 301, in response to the switch clock signal "clk_chn", generates a switch signal "switch" enabling the switch circuit 201 to change the connection destination of its first input node 210 and supplies it to the switch circuit 201.

Only when supplied with the clock signal "CLK", the clock management circuit 300 outputs a clock output signal "clk_sw" in response to output signals ("request1" and "request2") from comparator circuits 111 and 112.

The clock output signal "clk_sw" from the clock management circuit 300 is supplied to a gate driver circuit 302. The gate driver circuit 302 generates a gate signal "gate_drive" and supplies it to a switched capacitor power supply circuit unit 10. The gate signal "gate_drive" includes the complementary gate drive signals ("φ1" and "φ2") in the aforementioned embodiments.

In accordance with this embodiment, the single switched capacitor power supply circuit unit 10 can have its output voltage supplied in a time-division format to first and second output terminals 121 and 122 via a switch circuit 201. Thus, output voltages (Vout1 and Vout2) can be supplied to a plurality of loads (not illustrated) individually. Also, such control that the output voltages (Vout1 and Vout2) are compared with their respective reference voltages (Vref1 and Vref2) and that when the output voltages (Vout1 and Vout2) become lower than their respective reference voltages (Vref1 and Vref2), the switched capacitor power supply circuit unit 10 can have its output voltage stepped up to retain the output voltages (Vout1 and Vout2) at the reference voltages (Vref1 and Vref2) can be contemplated. Also, the clock management circuit 300 is configured to operate only when it is supplied with the clock signal "CLK", and thereby, consumed power can be reduced. In this embodiment, similarly, combined with any other control of the aforementioned embodiments, for example, such control that the conversion ratio for the switched capacitor power supply circuit unit 10 is varied according to the switching between the first and second output voltages Vout1 and Vout2 and that the first and second output voltages Vout1 and Vout2 are of different voltage levels may be contemplated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switched capacitor power supply circuit comprising a switched capacitor power supply circuit unit, the switched capacitor power supply circuit unit comprising:
    an input terminal to which an input voltage is applied;
    an output terminal that outputs an output voltage;
    a first connection node;
    a second connection node;
    a third connection node;
    a fourth connection node;
    a fifth connection node;
    a sixth connection node;
    a first capacitor connected between the third and fourth connection nodes;
    a second capacitor connected between the fifth and sixth connection nodes;
    a third capacitor connected between the first and second connection nodes;
    a first switching element connected between the fourth connection node and ground;
    a second switching element connected between the output terminal and the sixth connection node;
    a third switching element connected between the sixth connection node and the ground;
    a fourth switching element connected between the output terminal and the third connection node;
    a fifth switching element connected between the output terminal and the fifth connection node;
    a sixth switching element connected between the output terminal and the fourth connection node;
    a seventh switching element connected between the first and fifth connection nodes;
    an eighth switching element connected between the input terminal and the first connection node;
    a ninth switching element connected between the input terminal and the second connection node;
    a tenth switching element connected between the second and third connection nodes; and
    a control circuit configured to switch between on and off states of each of the first to tenth switching elements to obtain a predetermined conversion ratio, wherein
    while the switched capacitor power supply circuit unit is keeping the predetermined conversion ratio for a certain period, the control circuit is further configured to:
        select a first group of one or more of the first to tenth switching elements based on the predetermined conversion ratio;
        keep the selected first group of one or more switching elements in on or off state for the certain period;
        select a second group of one or more of unselected switching elements of the first to tenth switching elements based on the predetermined conversion ratio;
        identify the eighth switching element as a switching element to be turned on and off in a first phase which has a predetermined cycle during the certain period;
        alternately turn on and off the selected second group of one or more switching elements and the eighth switching element in the first phase during the certain period;
        identify the seventh switching element as a switching element to be turned on and off in a second phase which is complementary to the first phase; and
        alternately turn on and off unselected and unidentified switching elements among the first to tenth switching elements and the seventh switching element in the second phase during the certain period.

2. The switched capacitor power supply circuit according to claim 1, wherein the switched capacitor power supply circuit unit further includes an eleventh switching element connected between the third and fifth connection nodes.

3. The switched capacitor power supply circuit according to claim 2, wherein the switched capacitor power supply circuit unit further includes:
    a twelfth switching element connected between the input terminal and the sixth connection node; and
    a thirteenth switching element connected between the input terminal and the fourth connection node.

4. A switched capacitor power supply circuit comprising:
    a switched capacitor power supply circuit unit including a plurality of capacitors and configured to change a connection configuration between the plurality of capacitors to supply to an output terminal a voltage obtained by converting an input voltage with a predetermined conversion ratio as an output voltage; and
    a control circuit configured to supply to the switched capacitor power supply circuit unit a control signal for changing the conversion ratio by changing the connection configuration between the plurality of capacitors according to the output voltage,
    wherein
    the switched capacitor power supply circuit unit includes:
    an input terminal to which the input voltage is applied;
    an output terminal that outputs the output voltage;
    a first connection node;
    a second connection node;
    a third connection node;
    a fourth connection node;
    a fifth connection node;
    a sixth connection node;
    a first capacitor connected between the third and fourth connection nodes;
    a second capacitor connected between the fifth and sixth connection nodes;
    a third capacitor connected between the first and second connection nodes;
    a first switching element connected between the fourth connection node and ground;
    a second switching element connected between the output terminal and the sixth connection node;
    a third switching element connected between the sixth connection node and the ground;
    a fourth switching element connected between the output terminal and the third connection node;
    a fifth switching element connected between the output terminal and the fifth connection node;
    a sixth switching element connected between the output terminal and the fourth connection node;
    a seventh switching element connected between the first and fifth connection nodes;

an eighth switching element connected between the input terminal and the first connection node;
a ninth switching element connected between the input terminal and the second connection node; and
a tenth switching element connected between the second and third connection nodes, wherein
the control circuit is configured to switch between on and off states of each of the first to tenth switching elements to obtain a predetermined conversion ratio, wherein
while the switched capacitor power supply circuit unit is keeping the predetermined conversion ratio for a certain period, the control circuit is further configured to:
  select a first group of one or more of the first to tenth switching elements based on the predetermined conversion ratio;
  keep the selected first group of one or more switching elements in on or off state for the certain period;
  select a second group of one or more of unselected switching elements of the first to tenth switching elements based on the predetermined conversion ratio;
  identify the eighth switching element as a switching element to be turned on and off in a first phase which has a predetermined cycle during the certain period;
  alternately turn on and off the selected second group of one or more switching elements and the eighth switching element in the first phase during the certain period;
  identify the seventh switching element as a switching element to be turned on and off in a second phase which is complementary to the first phase; and
  alternately turn on and off unselected and unidentified switching elements among the first to tenth switching elements and the seventh switching element in the second phase during the certain period.

5. The switched capacitor power supply circuit according to claim 4, wherein the control circuit changes, among a plurality of switching elements connected between the plurality of capacitors, a combination of switching elements that are turned on while the predetermined conversion ratio keeps unchanged, according to the input voltage so as to change the conversion ratio.

6. The switched capacitor power supply circuit according to claim 5, wherein the control circuit operates in synchronization with a predetermined clock signal.

7. The switched capacitor power supply circuit according to claim 5, further comprising a conversion ratio selection circuit that selects conversion ratio corresponding to the input voltage from among conversion ratios prepared in advance, wherein
the control circuit changes the connection configuration between the plurality of capacitors in response to an output signal from the conversion ratio selection circuit.

8. The switched capacitor power supply circuit according to claim 4, wherein the control circuit changes the connection configuration between the plurality of capacitors to change the conversion ratio when a duration for which the output voltage continues to be lower than a predetermined reference voltage becomes longer than a predetermined threshold duration.

9. The switched capacitor power supply circuit according to claim 4, further comprising:
a comparator circuit that compares the output voltage with a predetermined reference voltage; and
a frequency counter circuit that counts a number of times by which the output voltage becomes lower than the predetermined reference voltage, based upon an output signal from the comparator circuit, wherein
the control circuit changes the connection configuration between the plurality of capacitors to change the conversion ratio according to a count result from the frequency counter circuit.

10. The switched capacitor power supply circuit according to claim 5, further comprising a switch circuit that supplies the output voltage from the switched capacitor power supply circuit unit to one of first and second output terminals by switching between the first and second output terminals.

11. The switched capacitor power supply circuit according to claim 10, further comprising:
a first comparator circuit that compares a voltage at the first output terminal with a first reference voltage; and
a second comparator circuit that compares a voltage at the second output terminal with a second reference voltage, wherein
the control circuit, in response to an output signal from the first comparator circuit, sets conversion ratio for the switched capacitor power supply circuit unit to a first conversion ratio when the output voltage from the switched capacitor power supply circuit unit is supplied to the first output terminal, and
the control circuit, in response to an output signal from the second comparator circuit, sets the conversion ratio for the switched capacitor power supply circuit unit to a second conversion ratio when the output voltage from the switched capacitor power supply circuit unit is supplied to the second output terminal.

12. A switched capacitor power supply circuit comprising:
a first switched capacitor power supply circuit unit including a plurality of capacitors and configured to change a connection configuration between the plurality of capacitors and to charge and discharge the plurality of capacitors so as to output a first output voltage obtained by converting an input voltage with a first conversion ratio;
a second switched capacitor power supply circuit unit including a plurality of capacitors and configured to change a connection configuration between the plurality of capacitors and to charge and discharge the plurality of capacitors so as to output a second output voltage obtained by converting the input voltage with a second conversion ratio;
a control circuit configured to supply a first drive signal for driving the first switched capacitor power supply circuit unit and a second drive signal for driving the second switched capacitor power supply circuit unit;
a shared output terminal to which output voltages from the first and second switched capacitor power supply circuit units are supplied;
a comparator circuit that compares a voltage at the shared output terminal with a predetermined reference voltage;
a duration calculation circuit that calculates a length of duration for which the voltage at the shared output terminal continues to be lower than the predetermined reference voltage based upon the output signal from the comparator circuit; and
a counter circuit that counts a number of times by which the voltage at the shared output terminal becomes lower than the predetermined reference voltage based upon the output signal from the comparator circuit,
wherein the control circuit is configured to:

activate both the first and second switched capacitor power supply circuit units when the length of duration becomes longer than a predetermined threshold duration length; and stop one of the first and second switched capacitor power supply circuit units when the number of times per unit time becomes smaller than a predetermined threshold number of times.

13. The switched capacitor power supply circuit according to claim 12, wherein
the first switched capacitor power supply circuit unit includes:
an input terminal to which the input voltage is applied;
an output terminal that outputs the first output voltage;
a first connection node;
a second connection node;
a third connection node;
a fourth connection node;
a fifth connection node;
a sixth connection node;
a first capacitor connected between the third and fourth connection nodes;
a second capacitor connected between the fifth and sixth connection nodes;
a third capacitor connected between the first and second connection nodes;
a first switching element connected between the fourth connection node and ground;
a second switching element connected between the output terminal and the sixth connection node;
a third switching element connected between the sixth connection node and the ground;
a fourth switching element connected between the output terminal and the third connection node;
a fifth switching element connected between the output terminal and the fifth connection node;
a sixth switching element connected between the output terminal and the fourth connection node;
a seventh switching element connected between the first and fifth connection nodes;
an eighth switching element connected between the input terminal and the first connection node;
a ninth switching element connected between the input terminal and the second connection node; and
a tenth switching element connected between the second and third connection nodes, wherein
the control circuit is configured to switch between on and off states of each of the first to tenth switching elements to obtain a predetermined conversion ratio, wherein
while the switched capacitor power supply circuit unit is keeping the predetermined conversion ratio for a certain period, the control circuit is further configured to:
select a first group of one or more of the first to tenth switching elements based on the predetermined conversion ratio;
keep the selected first group of one or more switching elements in on or off state for the certain period;
select a second group of one or more of unselected switching elements of the first to tenth switching elements based on the predetermined conversion ratio;
identify the eighth switching element as a switching element to be turned on and off in a first phase which has a predetermined cycle during the certain period;
alternately turn on and off the selected second group of one or more switching elements and the eighth switching element in the first phase during the certain period;
identify the seventh switching element as a switching element to be turned on and off in a second phase which is complementary to the first phase; and
alternately turn on and off unselected and unidentified switching elements among the first to tenth switching elements and the seventh switching element in the second phase during the certain period.

14. A switched capacitor power supply circuit comprising:
a switched capacitor power supply circuit unit including a plurality of capacitors and configured to change a connection configuration between the plurality of capacitors to supply to an output terminal a voltage obtained by converting an input voltage with a predetermined conversion ratio as an output voltage;
a comparator circuit that compares the output voltage with a predetermined reference voltage and outputs an output signal indicating the comparison result;
a reference voltage control circuit configured to change a value of the predetermined reference voltage in response to the output signal of the comparator circuit; and
a control circuit configured to supply to the switched capacitor power supply circuit unit a control signal for changing the conversion ratio by changing the connection configuration between the plurality of capacitors according to the output voltage, wherein
the reference voltage control circuit lowers the value of the predetermined reference voltage from a first value to a second value when the output signal of the comparator circuit indicates that the output voltage is lower than the first value of the predetermined reference voltage, and
the control circuit is configured to:
maintain the conversion ratio while the output voltage is lower than the first value and is higher than the second value of the predetermined reference voltage; and
change the connection configuration between the plurality of capacitors to change the conversion ratio from a first conversion ratio to a second conversion ratio which is higher than the first conversion ratio when the comparator circuit outputs an output signal which indicates that the output voltage is lower than the second value of the predetermined reference voltage.

15. A switched capacitor power supply circuit according to claim 14, wherein the switched capacitor power supply circuit unit includes:
an input terminal to which the input voltage is applied;
an output terminal that outputs the output voltage;
a first connection node;
a second connection node;
a third connection node;
a fourth connection node;
a fifth connection node;
a sixth connection node;
a first capacitor connected between the third and fourth connection nodes;
a second capacitor connected between the fifth and sixth connection nodes;
a third capacitor connected between the first and second connection nodes;

a first switching element connected between the fourth connection node and ground;
a second switching element connected between the output terminal and the sixth connection node;
a third switching element connected between the sixth connection node and the ground;
a fourth switching element connected between the output terminal and the third connection node;
a fifth switching element connected between the output terminal and the fifth connection node;
a sixth switching element connected between the output terminal and the fourth connection node;
a seventh switching element connected between the first and fifth connection nodes;
an eighth switching element connected between the input terminal and the first connection node;
a ninth switching element connected between the input terminal and the second connection node; and
a tenth switching element connected between the second and third connection nodes, wherein
the control circuit is configured to switch between on and off states of each of the first to tenth switching elements to obtain a predetermined conversion ratio, wherein
while the switched capacitor power supply circuit unit is keeping the predetermined conversion ratio for a certain period, the control circuit is further configured to:
select a first group of one or more of the first to tenth switching elements based on the predetermined conversion ratio;
keep the selected first group of one or more switching elements in on or off state for the certain period;
select a second group of one or more of unselected switching elements of the first to tenth switching elements based on the predetermined conversion ratio;
identify the eighth switching element as a switching element to be turned on and off in a first phase which has a predetermined cycle during the certain period;
alternately turn on and off the selected second group of one or more switching elements and the eighth switching element in the first phase during the certain period;
identify the seventh switching element as a switching element to be turned on and off in a second phase which is complementary to the first phase; and
alternately turn on and off unselected and unidentified switching elements among the first to tenth switching elements and the seventh switching element in the second phase during the certain period.

\* \* \* \* \*